United States Patent
Ohori et al.

(10) Patent No.: US 12,009,767 B2
(45) Date of Patent: Jun. 11, 2024

(54) MOTOR CONTROL DEVICE, MOTOR CONTROL METHOD, AND MOTOR UNIT

(71) Applicant: MITSUBA Corporation, Gunma (JP)

(72) Inventors: Ryo Ohori, Gunma (JP); Naoki Shioda, Gunma (JP); Masaki Hayata, Gunma (JP); Takashi Yatsuda, Gunma (JP); Atsushi Kawasaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 149 days.

(21) Appl. No.: 17/442,576

(22) PCT Filed: Mar. 26, 2020

(86) PCT No.: PCT/JP2020/013643
§ 371 (c)(1),
(2) Date: Sep. 23, 2021

(87) PCT Pub. No.: WO2020/196744
PCT Pub. Date: Oct. 1, 2020

(65) Prior Publication Data
US 2022/0190756 A1 Jun. 16, 2022

(30) Foreign Application Priority Data
Mar. 26, 2019 (JP) ................ 2019-059243

(51) Int. Cl.
*H02P 6/16* (2016.01)
*B60J 7/057* (2006.01)
*B60S 1/08* (2006.01)

(52) U.S. Cl.
CPC ............ *H02P 6/16* (2013.01); *B60J 7/0573* (2013.01); *B60S 1/08* (2013.01); *H02P 2209/07* (2013.01);
(Continued)

(58) Field of Classification Search
CPC .... H02P 6/16; H02P 2209/07; H02P 2209/11; H02P 2209/13; B60S 1/08
(Continued)

(56) References Cited

U.S. PATENT DOCUMENTS

2016/0373047 A1* 12/2016 Loken ............... H02M 7/53875
2020/0350849 A1* 11/2020 Tai ............................. B60S 1/08

FOREIGN PATENT DOCUMENTS

| EP | 2840700 | 2/2015 |
| JP | 2003274623 | 9/2003 |

(Continued)

OTHER PUBLICATIONS

JP 2019004675 A "Wiper Device for Vehicle" Inventor Information: Koide Keisuke Date Published: Jan. 10, 2019 (Year: 2019).*
(Continued)

*Primary Examiner* — Jorge L Carrasquillo
(74) *Attorney, Agent, or Firm* — JCIPRNET

(57) ABSTRACT

A motor control device for controlling a brushless motor including a rotor and a three-phase armature coil includes: a position detection unit which detects the rotational position of the rotor; a control unit which outputs, in a first control mode or a second control mode, a first drive signal or a second drive signal to an inverter at a current-supply timing based on the rotational position of the rotor; and the inverter which outputs a first current-supply signal or a second current-supply signal to the three-phase armature coil when the first drive signal or the second drive signal is input. For any two of the three phases, a duty value when the duty of the applied voltages is the same is larger in the second control mode than in the first control mode.

10 Claims, 24 Drawing Sheets

(52) U.S. Cl.
CPC ...... *H02P 2209/11* (2013.01); *H02P 2209/13* (2013.01)

(58) Field of Classification Search
USPC .................................................. 318/400.01
See application file for complete search history.

(56) References Cited

FOREIGN PATENT DOCUMENTS

| JP | 2006223097 | 8/2006 |
|---|---|---|
| JP | 2014195389 | 10/2014 |
| JP | 2015033278 | 2/2015 |
| JP | 2019004675 | 1/2019 |
| WO | 2017159214 | 9/2017 |

OTHER PUBLICATIONS

JP 2006223097 A Permanent Magnet Motor, Control Method for Permanent Magnet Motor, Control Device for Permanent Magnet Motor, Compressor, and Refrigeration/Air-Conditioning Device: Date Published: Aug. 24, 2006 Inventor Information Name: Baba Kazuhiko et al. (Year: 2006).*
CN 104272579 A "Brushless Motor And Wiper" Date Published: Jan. 12, 2018 Iventor: Kimura, Masaaki et al. (Year: 2018).*
"Notice of Reasons for Refusal of Japan Counterpart Application", dated Dec. 1, 2022, with English translation thereof, p. 1-p. 6.
"Search Report of Europe Counterpart Application", dated Mar. 21, 2022, p. 1-p. 8.
Julio C. Moreira, "Indirect sensing for rotor flux position of permanent magnet AC motors operating over a wide speed range," IEEE Transactions on Industry Applications, vol. 32, Nov./Dec. 1996, pp. 1394-1401.
Julio C. Moreira, "Indirect sensing for rotor flux position of permanent magnet AC motors operating in a wide speed range," Proceedings of 1994 IEEE Industry Applications Society Annual Meeting, Oct. 1994, pp. 401-407.
"International Search Report (Form PCT/ISA/210) of PCT/JP2020/013643", dated Jun. 30, 2020, with English translation thereof, pp. 1-4.
"Office Action of Europe Counterpart Application", dated Jun. 23, 2023, p. 1-p. 4.
"Office Action of Japan Counterpart Application", dated May 17, 2023, with English translation thereof, p. 1-p. 10.

* cited by examiner normal current-supply section (three-phase current-supply)

overlap current-supply section (two-phase current-supply)

current-supply angle: 155 deg

MOTOR CONTROL DEVICE, MOTOR CONTROL METHOD, AND MOTOR UNIT

CROSS-REFERENCE TO RELATED APPLICATION

This application is a 371 application of the International PCT application serial no. PCT/JP2020/013643, filed on Mar. 26, 2020, which claims the priority benefits of Japan Patent Application No. 2019-059243, filed on Mar. 26, 2019. The entirety of each of the above-mentioned patent applications is hereby incorporated by reference herein and made a part of this specification.

BACKGROUND

Technical Field

The present invention relates to a motor control device, a motor control method, and a motor unit.

Related Art

Conventionally, in a wiper device mounted on a vehicle, a wiper motor (brushless motor) is used as a drive source for making a wiper arm swing. By driving the wiper motor, the wiper device makes the wiper arm swing within a predetermined range on a front glass to wipe off dust, raindrops, and the like adhering to the front glass.

Generally, the wiper device includes: a low-speed (Lo) working mode in which a wiper blade is made to act at a low speed by driving the wiper motor at a low speed; and a high-speed (Hi) working mode in which the wiper blade is made to act at a high speed by driving the wiper motor at a high speed (for example, see Patent literatures 1 and 2).

In a wiper device described in Patent literature 1, the drive control for supplying a current to the brushless motor is set as a rectangular wave drive in the low-speed working mode, and is set as an advance-angle/wide-angle current-supply drive in the high-speed working mode. Note that, the advance-angle/wide-angle current-supply drive refers to a drive in which the current-supply angle is set larger than that in the rectangular wave drive in the low-speed working mode, and a current is supplied to the brushless motor at a time that is advanced.

In addition, in a wiper device described in Patent literature 2, the drive control for supplying a current to the brushless motor is set as a sine wave drive control in the low-speed working mode, and is set as an advance-angle/wide-angle current-supply drive in the high-speed working mode.

Accordingly, the control of the wiper device described in Patent literature 2 can reduce a working sound of the brushless motor in the low-speed working mode (make the brushless motor quiet) compared with the control of the wiper device described in Patent literature 1 (see Paragraphs [0037], [0048], and [0056] of Patent literature 2).

LITERATURE OF RELATED ART

Patent Literature

Patent literature 1: Japanese Patent Laid-Open No. 2014-195389
Patent literature 2: International Publication No. 2017/159214

SUMMARY

Problems to be Solved

However, in an electrical device for a vehicle such as a wiper device or the like, it is desirable to flexibly perform motor control in consideration of reduction in current consumption and improvement of motor output.

The present invention is made in consideration of the above circumstances, and can perform flexible motor control in consideration of at least one of reduction in current consumption and improvement of motor output. The main purpose thereof is to provide a motor control device, a motor control method, and a motor unit.

Means to Solve Problems

In order to solve the above problems, one aspect of the present invention is a motor control device, which controls a brushless motor including a rotor and a three-phase armature coil of U-phase, V-phase, and W-phase, the motor control device including: a position detection unit which detects the rotational position of the rotor; a control unit which is capable of selecting a first control mode and a second control mode, and which outputs, in the first control mode, a first drive signal to an inverter at a current-supply timing based on the rotational position of the rotor, and outputs, in the second control mode, a second drive signal to the inverter at the current-supply timing based on the rotational position of the rotor; and the inverter which outputs, in the first control mode, a first current-supply signal as the applied voltage applied to the three-phase armature coil, and outputs, in the second control mode, a second current-supply signal as the applied voltage applied to the three-phase armature coil; wherein for any two of the three phases, a duty value when the duty of the applied voltages is the same is larger in the second control mode than in the first control mode.

Effect

According to the present invention, flexible motor control can be performed in consideration of at least one of reduction in current consumption and improvement of motor output.

In addition, according to another one embodiment of the present invention, in the high-speed working mode (the second control mode), the brushless motor is driven sinusoidally by inputting the second current-supply signal, and thus the working sound of the brushless motor in the high-speed working mode can be suppressed.

DESCRIPTION OF THE EMBODIMENTS

Figure 1:
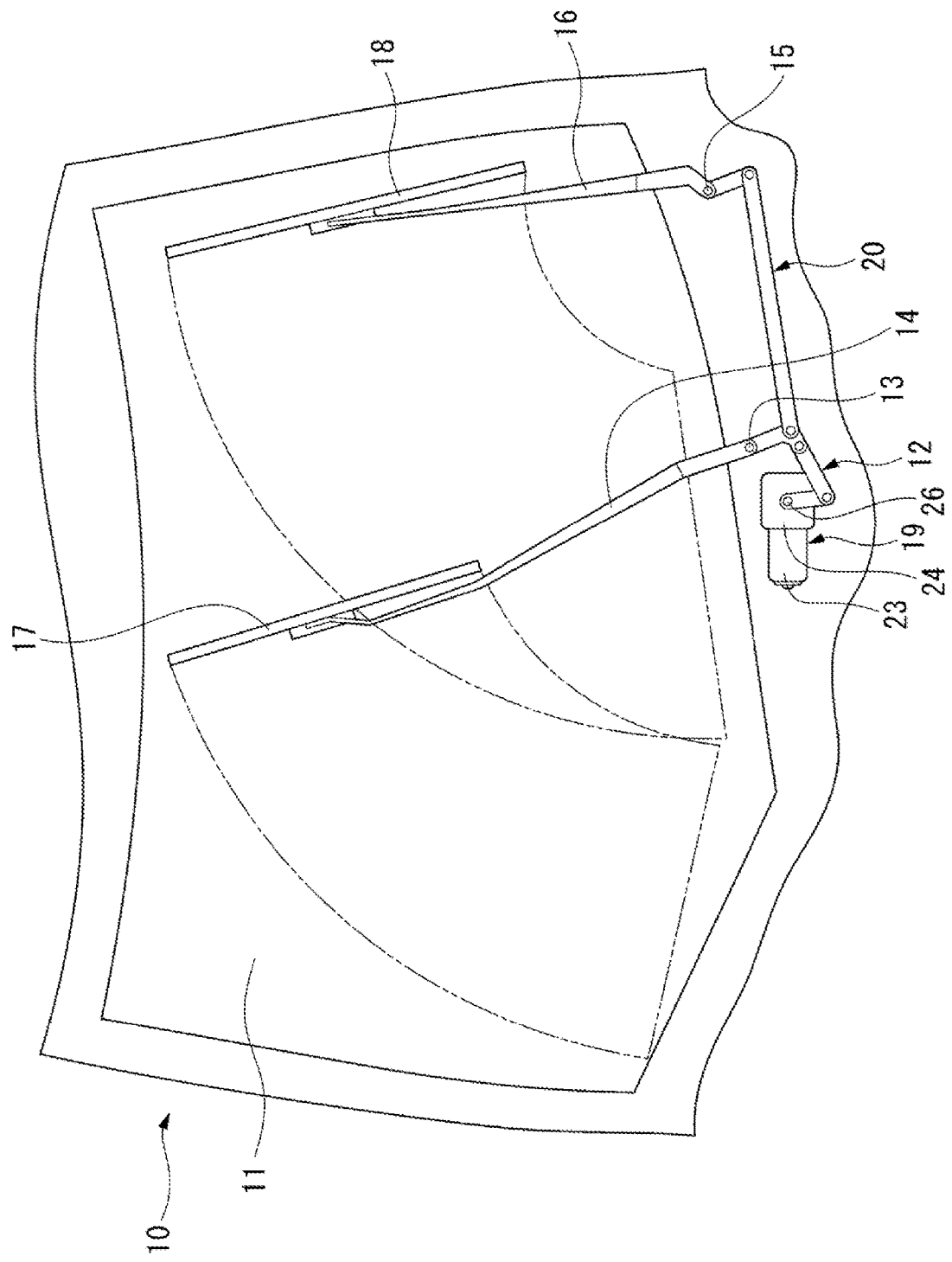
FIG. 1 is a diagram showing an example of a schematic configuration showing a front glass 11 of a vehicle 10 on which a wiper device 12 equipped with a motor control device in the embodiment is mounted.

Hereinafter, aspects of the present invention are described through an embodiment of the invention, but the following embodiment does not limit the invention in the claims. In addition, not all combinations of features described in the embodiment are essential to the solutions of the invention. It should be noted that in the drawings, the same or similar parts may be marked with the same signs, and repeated description may be omitted.

A motor control device of the embodiment controls a brushless motor that makes the wiper arm swing. Besides, in a low output mode (a first control mode) in which the output of the brushless motor is low, the motor control device supplies a current to the brushless motor by a sine wave (a first current-supply signal) that is obtained by superimposing a harmonic on a sine wave. In a high output mode (a second control mode) in which the output is higher than that in the low output mode, the motor control device supplies a current to the brushless motor by a sine wave (a second current-supply signal) that is obtained by making the first current-supply signal to be a wide-angle trapezoidal wave. Hereinafter, the motor control device in the embodiment is described using the drawings.

FIG. 1 is a diagram showing an example of a schematic configuration showing a front glass 11 of a vehicle 10 on which a wiper device 12 equipped with a motor control device in the embodiment is mounted.

As shown in FIG. 1, the vehicle 10 includes the front glass 11 and the wiper device 12.

The wiper device 12 wipes the front glass 11.

The wiper device 12 includes: wiper arms 14 and 16, wiper blades 17 and 18, a motor unit 19, and a power transmission mechanism 20.

The wiper arm 14 swings around a pivot shaft 13. The wiper arm 16 swings around a pivot shaft 15.

The wiper blade 17 is attached to the free end of the wiper arm 14. The wiper blade 18 is attached to the free end of the wiper arm 16.

The motor unit 19 drives the wiper arms 14 and 16. In the embodiment, the power of the motor unit 19 is individually transmitted to the wiper arms 14 and 16 via the power transmission mechanism 20 configured by levers, links, and the like.

Figure 2:
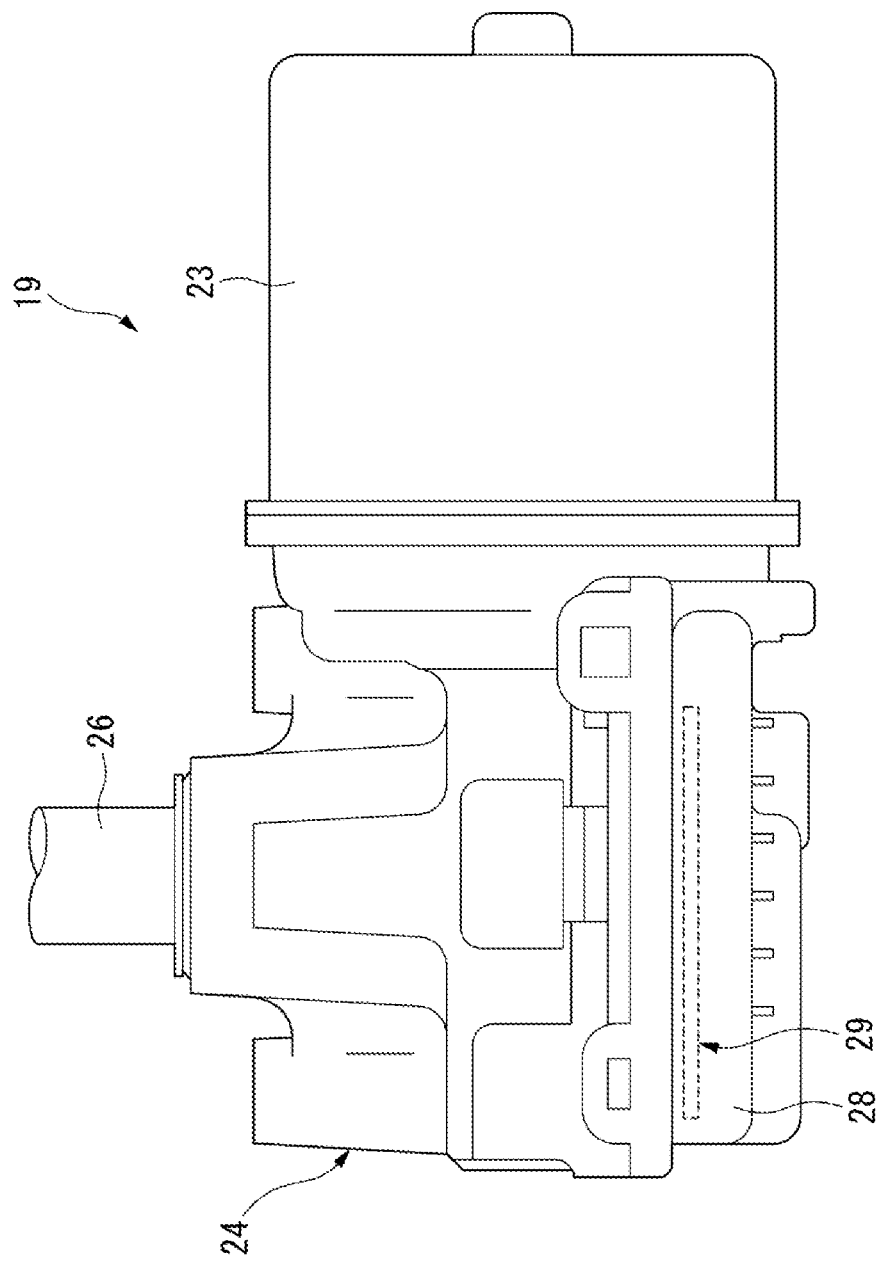
FIG. 2 is a diagram showing an example of the appearance of a motor unit 19 in the embodiment.
Figure 3:
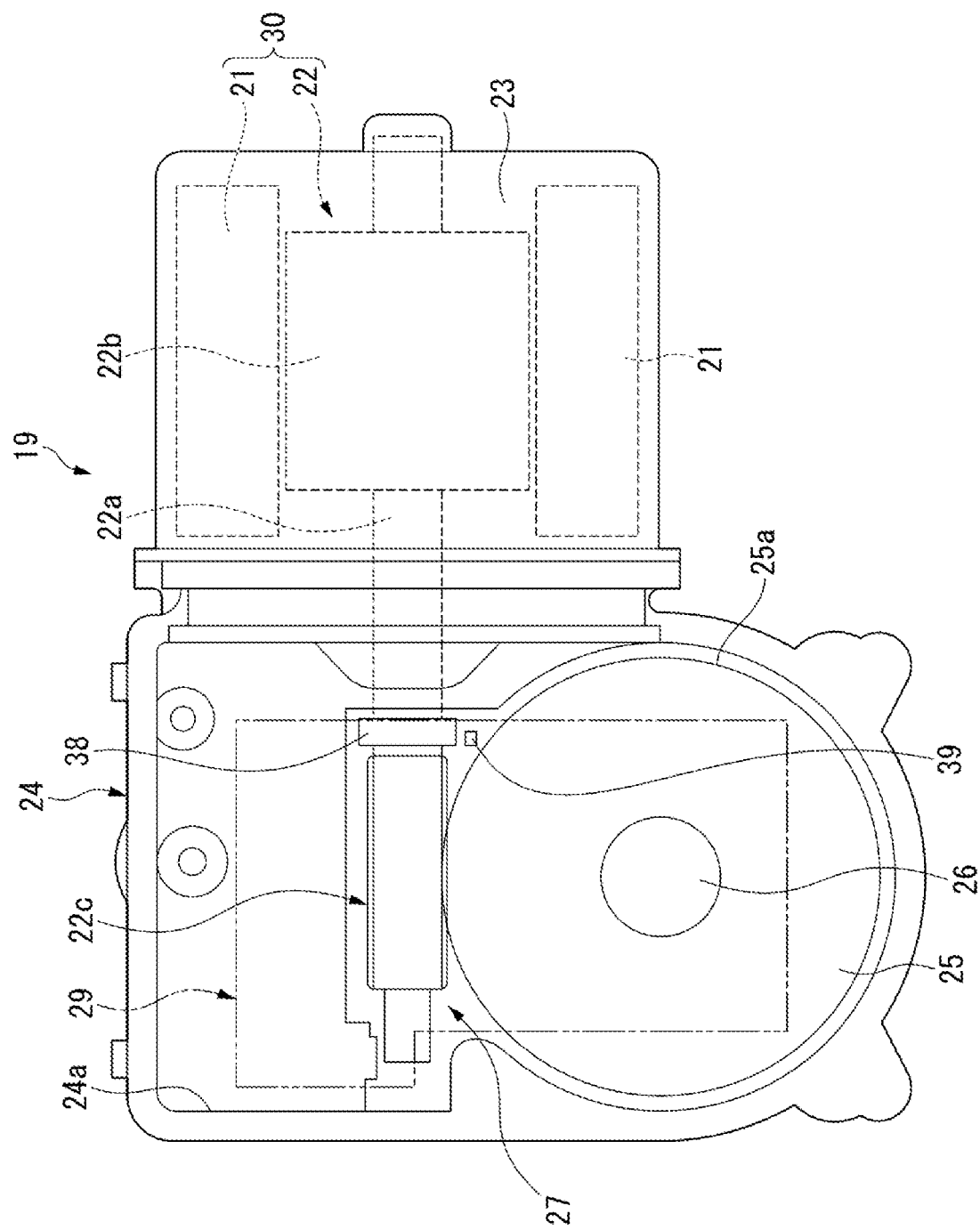
FIG. 3 is a bottom view of the motor unit 19 in the embodiment in a state in which an undercover is removed.

FIG. 2 is a diagram showing an example of the appearance of the motor unit 19 in the embodiment. FIG. 3 is a bottom view of the motor unit 19 shown in FIG. 2 in a state in which an undercover 28 is removed.

As shown in FIG. 2, the appearance of the motor unit 19 is mainly configured by a case 23 and a frame 24.

The case 23 has a bottomed cylindrical shape. The frame 24 has a hollow shape. The frame 24 and the case 23 are fixed by a fastening member (not shown).

As shown in FIG. 3, the motor unit 19 includes: a brushless motor 30, a rotor shaft 22a, an opening unit 24a, a worm wheel 25, an output shaft 26, a speed reduction mechanism 27, the undercover 28, a control substrate 29, a sensor magnet 38, and a motor control device 33.

The brushless motor 30 makes the wiper arms 14 and 16 swing based on a control instruction of the motor control device 33.

For example, the brushless motor 30 is a three-phase four-pole brushless motor.

The brushless motor 30 includes a stator 21 and a rotor 22. The stator 21 is fixed to the inner periphery of the case 23. The stator 21 includes three-phase armature coils 21u, 21v, and 21w. The armature coils 21u, 21v, and 21w are wound around the stator 21. For example, the three-phase armature coils 21u, 21v, and 21w are connected by a delta connection connected by a neutral point of one end. However, the connection is not limited to the delta connection and may be a Y connection. In addition, the brushless motor 30 is a motor in which each of the armature coils 21u, 21v, and 21w functions as both a positive electrode and a negative electrode.

For example, the rotor 22 is arranged on the inner side of the stator 21. The rotor 22 includes the rotor shaft 22a and a four-pole permanent magnet 22b attached to the rotor shaft 22a. A plurality of bearings (not shown) are arranged inside the case 23, and the rotor shaft 22a is supported by the plurality of bearings so as to be rotatable.

It should be noted that as shown in FIG. 3, an inner rotor type structure is used in which the rotor 22 is arranged on the inner side of the stator 21, but an outer rotor type structure may be used in which the rotor 22 is arranged on the outer side of the stator 21.

Approximately half of the rotor shaft 22a in the length direction is arranged inside the case 23, and approximately the half that remains is arranged inside the frame 24.

The speed reduction mechanism 27 is formed on the outer periphery of a part of the rotor shaft 22a which is disposed inside the frame 24. The speed reduction mechanism 27 includes a worm 22c and a gear 25a.

The worm 22c is arranged on the outer periphery of the rotor shaft 22a disposed inside the frame 24. The gear 25a is formed on the outer periphery of the worm wheel 25 arranged inside the frame 24. The gear 25a is meshed with the worm 22c.

The worm wheel 25 is configured to rotate integrally with the output shaft 26.

When the power of the rotor 22 is transmitted to the output shaft 26, the speed reduction mechanism 27 reduces the rotation speed (output rotation speed) of the output shaft 26 to be lower than the rotation speed (input rotation speed) of the rotor 22. In addition, in FIG. 2, a shaft hole (not shown) is arranged in the upper part of the frame 24. An end of the output shaft 26, which is opposite to an end of the output shaft 26 to which the worm wheel 25 is fixed, is exposed to the outside via the shaft hole of the frame 24. As shown in FIG. 1, the power transmission mechanism 20 is connected to the part of the output shaft 26 which is exposed to the outside of the frame 24.

The opening unit 24a is arranged in a part of the frame 24 which is opposite to the shaft hole. The opening unit 24a is formed for attaching the worm wheel 25 or the like to the inside of the frame 24. The undercover 28 is arranged so as to close the opening unit 24a. The undercover 28 has a tray shape.

The control substrate 29 is arranged in a space surrounded by the undercover 28 and the frame 24. As shown in FIG. 2, for example, the control substrate 29 is attached to the undercover 28. On the control substrate 29, the motor control device 33 that controls the brushless motor 30 is arranged.

The sensor magnet 38 is arranged at a location of the rotor shaft 22a which is disposed inside the frame 24. The sensor magnet 38 rotates integrally with the rotor shaft 22a. The sensor magnet 38 is magnetized in a way that the north pole and south pole are alternately arranged along the circumferential direction of the rotor shaft 22a.

Hereinafter, the motor control device 33 in the embodiment is described using the drawings.

Figure 4:
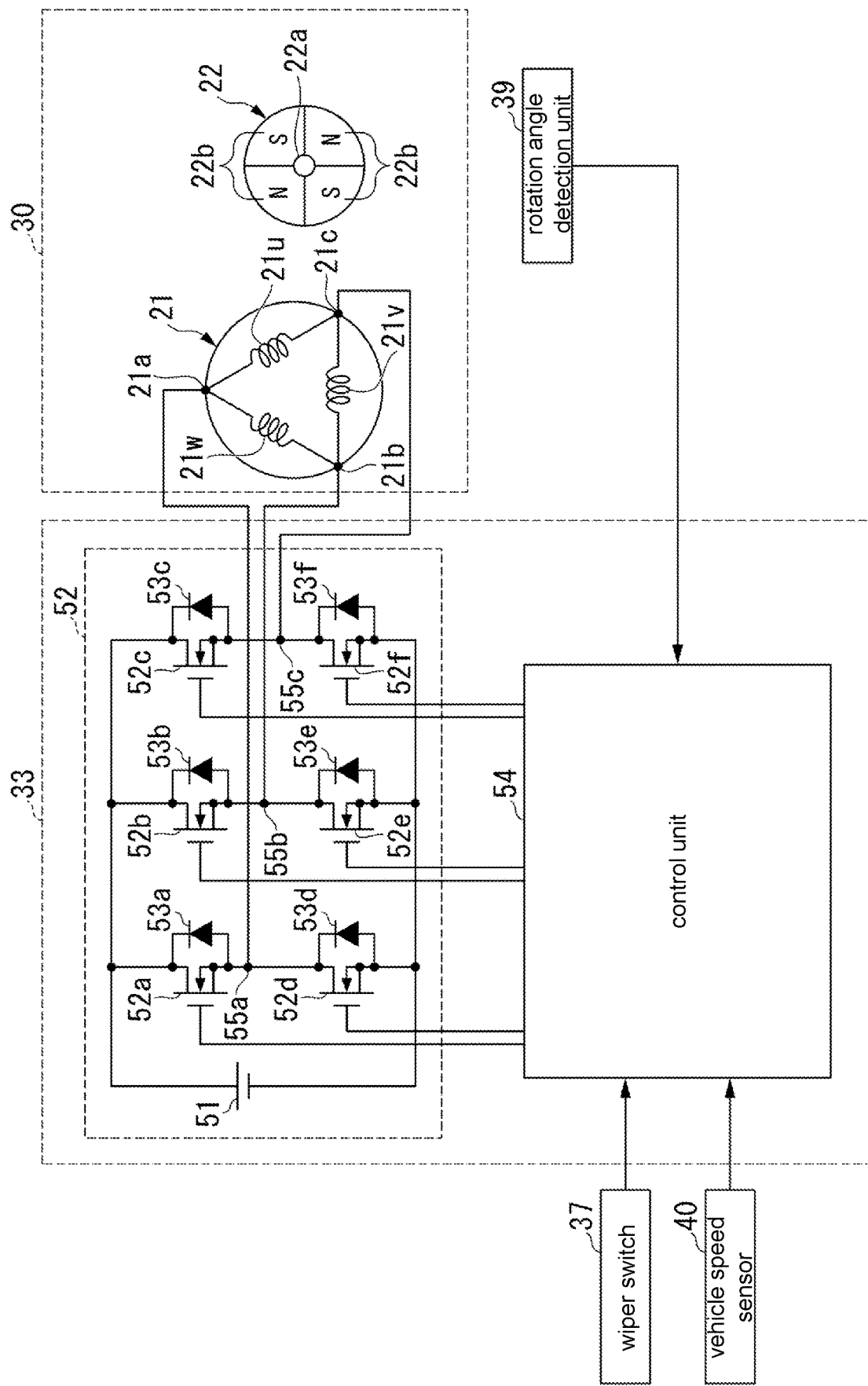
FIG. 4 is a diagram showing an example of a schematic configuration of a control system of the wiper device 12 in the embodiment.

FIG. 4 is a diagram showing an example of a schematic configuration of a control system of the wiper device 12 in the embodiment. The wiper device 12 includes a wiper switch 37, a rotation angle detection unit 39, a vehicle speed sensor 40, and the motor control device 33.

The wiper switch 37 is arranged inside the passenger compartment of the vehicle 10. The wiper switch 37 is a switch that makes the wiper arms 14 and 16 swing.

By the wiper switch 37, the mode can be switched to each of the following modes: a low-speed working mode in which the wiper arms 14 and 16 are made to act at a low speed (for example, a preset speed), a high-speed working mode in which the wiper arms 14 and 16 are made to act at a speed higher than that in the low-speed working mode, and a stop mode in which the swing action of the wiper arms 14 and 16 is stopped.

By being operated by the driver, the wiper switch 37 outputs an operation signal indicating the operation to the motor control device 33. For example, the driver can switch a wiping speed of the wiper arms 14 and 16 by operating the wiper switch 37 based on conditions such as the amount of rainfall, the amount of snowfall, and the like. When the amount of rainfall and the amount of snowfall are small, the driver can select the low-speed working mode in which the wiper arms 14 and 16 are made to act at a predefined low speed by operating the wiper switch 37. In this case, based on the operation of selecting the low-speed working mode by the driver, the wiper switch 37 outputs a low-speed working mode signal indicating the low-speed working mode to the motor control device 33 as an operation signal.

On the other hand, when the amount of rainfall and the amount of snowfall are large, the driver can operate the wiper switch 37 to select a high-speed working mode in which the wiper arms 14 and 16 are made to act at a speed higher than the above-mentioned low speed. In this case, based on the operation of selecting the high-speed working mode by the driver, the wiper switch 37 outputs a high-speed working mode signal indicating the high-speed working mode to the motor control device 33 as an operation signal.

In addition, when an operation of stopping the swing action of the wiper arms 14 and 16 is performed on the wiper switch 37 by the driver, the wiper switch 37 outputs a stop mode signal indicating the stop mode to the motor control device 33 as an operation signal.

The vehicle speed sensor 40 is arranged on the vehicle 10. The vehicle speed sensor 40 measures a traveling speed (hereinafter referred to as a "vehicle speed") V of the vehicle 10. The vehicle speed sensor 40 outputs the measured vehicle speed V of the vehicle 10 to the motor control device 33.

The rotation angle detection unit 39 detects a signal based on the rotation of the rotor 22. For example, the rotation angle detection unit 39 includes three Hall ICs, and the three Hall ICs are arranged in positions magnetically at 120 degrees from each other centered on the rotor shaft 22a. When the rotor 22 rotates, these three hall ICs output, to the motor control device 33, pulse signals that are respectively deviated from each other by 120-degree phase. That is, along with the rotation of the rotor 22, the rotation angle detection unit 39 generates pulse signals based on a change in the magnetic pole of the sensor magnet 38, and outputs the pulse signals to the motor control device 33.

The motor control device 33 includes an inverter 52 and a control unit 54.

The inverter 52 includes: six switching elements 52a to 52f connected by a three-phase bridge, and diodes 53a to 53f connected in antiparallel between respective collector-emitters of the switching elements 52a to 52f. Each of the switching elements 52a to 52f is, for example, a field effect transistor (FET) or an insulated gate bipolar transistor (IGBT). Each gate of the six bridge-connected switching elements 52a to 52f is connected to the control unit 54.

Drains or sources (collectors or emitters) of the switching elements 52a to 52f are connected to the delta-connected armature coils 21u, 21v, and 21w.

More specifically, a neutral point 55a, which is a connection point between the source of the switching element 52a and the drain of the switching element 52d, is connected to a connection point 21a between the armature coil 21w and the armature coil 21u. A neutral point 55b, which is a connection point between the source of the switching element 52b and the drain of the switching element 52e, is connected to a connection point 21b between the armature coil 21w and the armature coil 21v. A neutral point 55c, which is a connection point between the source of the switching element 52c and the drain of the switching element 52f, is connected to a connection point 21c between the armature coil 21v and the armature coil 21u.

Accordingly, the six switching elements 52a to 52f perform a switching action based on a drive signal (gate signal) output from the control unit 54, convert a power supply voltage of a direct current power supply 51 which is applied to the inverter 52 into an alternating-current voltage of three phases (U phase, V phase, and W phase), and supply the alternating-current voltage of three phases to the armature coils 21u, 21v, and 21w as a current-supply signal.

Based on the pulse signals supplied from the rotation angle detection unit 39, the control unit 54 decides the rotational position of the rotor 22. In addition, the control unit 54 detects the rotation speed of the rotor 22 based on the pulse signals. Then, the control unit 54 sinusoidally drives the brushless motor 30 in the low output mode in which the output of the brushless motor 30 is low.

That is, by outputting a first drive signal to the inverter 52, the control unit 54 supplies a current to the armature coils 21u, 21v, and 21w by a sine wave (a first current-supply signal) that is obtained by superimposing a harmonic on a sine wave, and rotationally drives the rotor 22. Here, in the embodiment, the first drive signal corresponds to the first current-supply signal. That is, the control unit 54 outputs the first drive signal as an instruction signal for controlling the inverter 52. Then, the inverter 52 sinusoidally drives each of the three phases by the first current-supply signal based on the instruction signal (details are described later using FIG. 6).

On the other hand, in the high output mode in which the output is higher than that in the low output mode, by outputting a second drive signal to the inverter 52, the control unit 54 supplies a current to the armature coils 21u, 21v, and 21w by a sine wave (a second current-supply signal) that is obtained by making the first current-supply signal to be a wide-angle trapezoidal wave, and rotationally drives the rotor 22. Here, in the embodiment, the second drive signal corresponds to the second current-supply signal. That is, the control unit 54 outputs the second drive signal as an instruction signal for controlling the inverter 52. Then, the inverter 52 sinusoidally drives each of the three phases by the second current-supply signal based on the instruction signal (details are described later using FIG. 7).

Hereinafter, the control unit 54 in the embodiment is described using FIG. 5.

Figure 5:
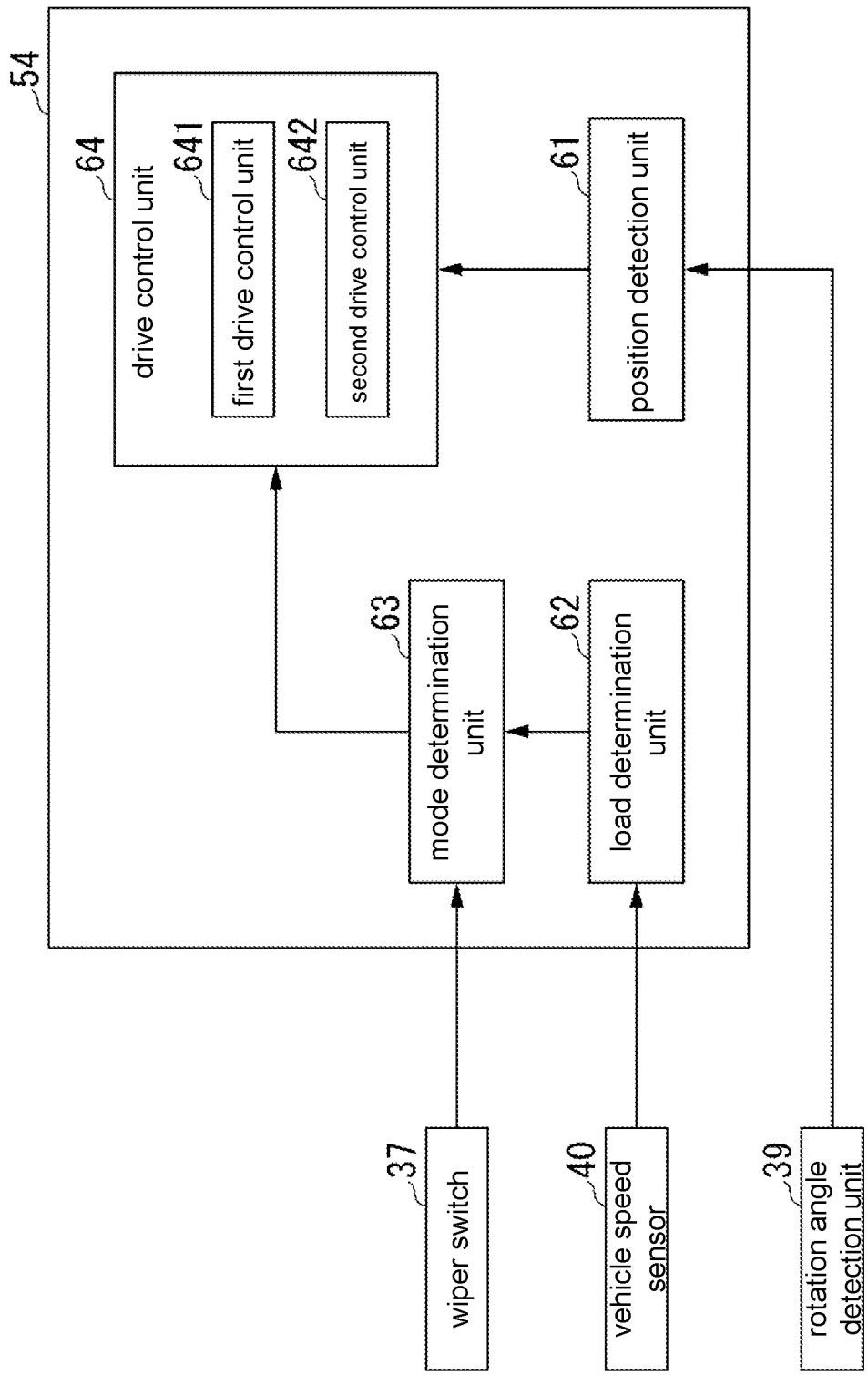
FIG. 5 is a diagram showing an example of a schematic configuration of a control unit 54 in the embodiment.

FIG. 5 is a diagram showing an example of a schematic configuration of the control unit 54 in the embodiment.

The control unit 54 includes: a position detection unit 61, a load determination unit 62, a mode determination unit 63, and a drive control unit 64.

The position detection unit 61 detects the rotational position of the rotor 22 based on the pulse signals supplied from the rotation angle detection unit 39. The position detection unit 61 outputs the detected rotational position of the rotor 22 to the drive control unit 64.

The load determination unit 62 determines whether or not the vehicle speed V measured by the vehicle speed sensor 40 exceeds a predetermined value Vth that is preset. When the vehicle speed V measured by the vehicle speed sensor 40 exceeds the predetermined value Vth, the load determination unit 62 determines that the load of the brushless motor 30 is a high load. When the load determination unit 62 determines that the load of the brushless motor 30 is a high load, the load determination unit 62 outputs a high load signal indicating the determination result to the mode determination unit 63. This is because when the vehicle speed V of the vehicle 10 increases, the air volume of the vehicle 10 to the front glass 11 increases, and the movement of the wiper blades 17 and 18 that wipe over the front glass 11 is hindered. In this case, the brushless motor 30 is required to make the wiper arms 14 and 16 swing at high output. Thus, when the vehicle speed V exceeds the predetermined value Vth, the control unit 54 generates a great torque for the brushless motor 30 by shifting from the low output mode to the high output mode, and increases the rotation speed of the brushless motor 30 by performing advance angle control at a predetermined electrical angle with reference to the rotational position of the rotor 22 which is detected by the position detection unit 61.

In addition, the load determination unit 62 determines whether or not the following predetermined value exceeds a predetermined value that is preset: a predetermined value of the current value of the brushless motor 30 or the rotation speed of the rotor 22 which is detected based on the pulse signals supplied from the rotation angle detection unit 39, or a predetermined value calculated from both the current value of the brushless motor 30 and the rotation speed of the rotor 22. The load determination unit 62 determines that the load of the brushless motor 30 is a high load when the following predetermined value exceeds the predetermined value that is preset: the predetermined value of the current value of the brushless motor 30 or the rotation speed of the rotor 22 which is detected based on the pulse signals supplied from the rotation angle detection unit 39, or the predetermined value calculated from both the current value of the brushless motor 30 and the rotation speed of the rotor 22. When the load determination unit 62 determines that the load of the brushless motor 30 is a high load, the load determination unit 62 outputs a high load signal indicating the determination result to the mode determination unit 63. This is because situation changes such as changes in the amount of rainfall or the like occur, resistance to the movement of the wiper blades 17 and 18 on the front glass 11 (wiping surface) of the vehicle 10 increases, and the movement of the wiper blades 17 and 18 is hindered. In this case, the brushless motor 30 is required to make the wiper arms 14 and 16 swing at high output. Thus, when the predetermined value of the current value of the brushless motor 30 or the rotation speed of the rotor 22, or the predetermined value calculated from both the current value of the brushless motor 30 and the rotation speed of the rotor 22 exceeds the predetermined value that is preset, the control unit 54 generates a great torque for the brushless motor 30 by shifting from the low output mode to the high output mode, and increases the rotation speed of the brushless motor 30 by performing advance angle control at a predetermined electrical angle with reference to the rotational position of the rotor 22 which is detected by the position detection unit 61.

The mode determination unit 63 determines whether the brushless motor 30 is driven in the low output mode or in the high output mode, or the drive of the brushless motor 30 is stopped.

When acquiring the low-speed working mode signal from the wiper switch 37, the mode determination unit 63 determines that the brushless motor 30 is driven in the low output mode, and outputs a low output mode signal indicating the low output mode to the drive control unit 64.

When acquiring the high-speed working mode signal from the wiper switch 37, the mode determination unit 63 determines that the brushless motor 30 is driven in the high output mode, and outputs a high output mode signal indicating the high output mode to the drive control unit 64. In addition, when acquiring the high load signal from the load determination unit 62, the mode determination unit 63 determines that the brushless motor 30 is driven in the high output mode, and outputs a high output mode signal indicating the high output mode to the drive control unit 64.

When acquiring the stop mode signal from the wiper switch 37, the mode determination unit 63 determines that the drive of the brushless motor 30 is stopped, and outputs a stop signal indicating the stop of the drive of the brushless motor 30 to the drive control unit 64.

The drive control unit 64 includes a first drive control unit 641 and a second drive control unit 642.

When acquiring the low output mode signal from the mode determination unit 63, the drive control unit 64 executes a third harmonic current-supply drive of the brushless motor 30 performed by the first drive control unit 641.

Figure 6:
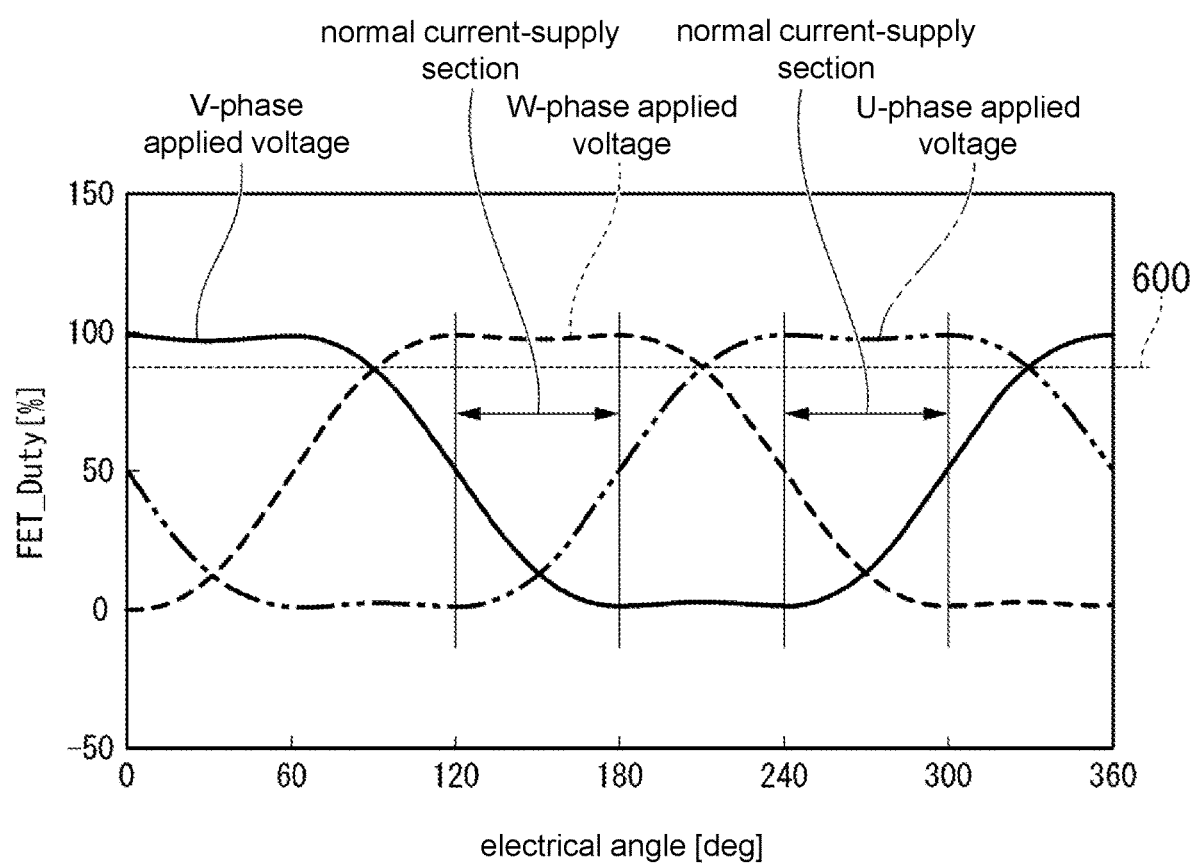
FIG. 6 is a timing chart showing a current-supply timing of each of U phase, V phase, and W phase by a first drive control unit 641 in the embodiment.

FIG. 6 is a timing chart showing a current-supply timing of each of U phase, V phase, and W phase by the first drive control unit 641 in the embodiment.

The angle from 0° to 360° shown on the horizontal axis of FIG. 6 is an electrical angle representing the current-supply period within one cycle of the first current-supply signal. In addition, the FET_Duty [%] shown on the vertical axis represents the duty of the applied voltage applied to each phase.

Here, as shown in FIG. 6, the first current-supply signal represents the applied voltage of each of the three phases in which the third harmonic is superimposed on the sine wave.

That is, in the first control mode, the inverter 52 outputs the first current-supply signal at a current-supply timing based on the rotational position of the rotor, and sinusoidally drives each of the three phases of the brushless motor, the first current-supply signal representing a current-supply timing of each of the three phases in which the third harmonic is superimposed on the sine wave.

In the following descriptions, drive control for supplying a current to the brushless motor 30 by the first current-supply signal may be referred to as the third harmonic current-supply drive.

In this way, by outputting the first drive signal to the inverter 52 at the current-supply timing based on the rotational position of the rotor 22 detected by the position detection unit 61, the first drive control unit 641 generates, to the inverter 52, the first current-supply signal for performing the third harmonic current-supply drive of the brushless motor 30.

As shown in FIG. 6, the first current-supply signal has a waveform in which a third harmonic is superimposed on a sine wave (hereinafter, referred to as a third harmonic superimposed wave). In the third harmonic superimposed wave, the duty (peak voltage) of the applied voltage at the peak of the waveform is about 100% (97 to 99%) in a certain section, and the duty of the applied voltage at the valley is about 0% (1 to 3%) in a certain section. Furthermore, in the first current-supply signal, in a section between a normal current-supply section where only the duty of the applied voltage of W phase is about 100% (97 to 99%) and a normal current-supply section where only the duty of the applied voltage of U phase is about 100%, the applied voltages of U phase, V phase and W phase are less than the peak voltage (97 to 99%). Note that, although not shown, there is also a normal current-supply section where only the duty of the applied voltage of V phase is about 100% (97 to 99%) during the current-supply period within one cycle of the first current-supply signal.

On the other hand, when acquiring the high output mode signal from the mode determination unit 63, the drive control unit 64 executes a wide-angle trapezoidal wave current-supply drive of the brushless motor 30 performed by the second drive control unit 642.

FIGS. 7A to 7D are timing charts showing the current-supply timing of each of U phase, V phase, and W phase by the second drive control unit 642 in the embodiment.

The angles from 0° to 360° shown on the horizontal axis of FIGS. 7A to 7D are electrical angles representing the current-supply period within one cycle of the second current-supply signal. In addition, the FET_Duty [%] shown on the vertical axis represents the duty of the applied voltage applied to each phase.

Figure 7A:
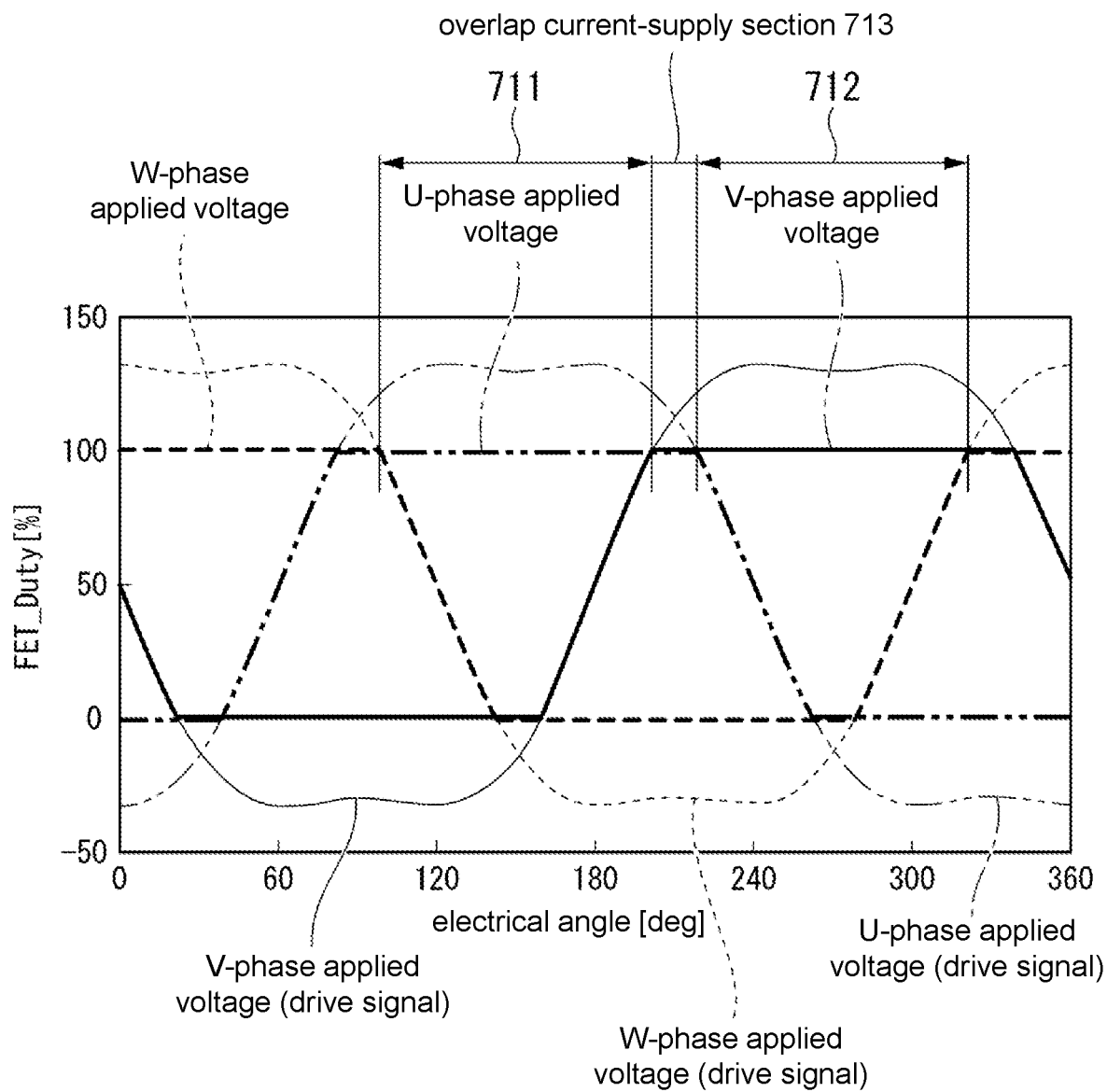
FIG. 7A is a timing chart showing a current-supply timing of each of U phase, V phase, and W phase by a second drive control unit 642 in the embodiment.

As shown in FIG. 7A, between a current-supply section (a normal current-supply section 711) where only the duty of the applied voltage of U-phase of the three phases is 100% and a current-supply section (a normal current-supply section 712) where only the duty of the applied voltage of V-phase is 100%, the second current-supply signal has a current-supply section (an overlap current-supply section 713) where both the duty of the applied voltage of U-phase and the duty of the applied voltage of the V-phase are 100%.

Figure 7B:
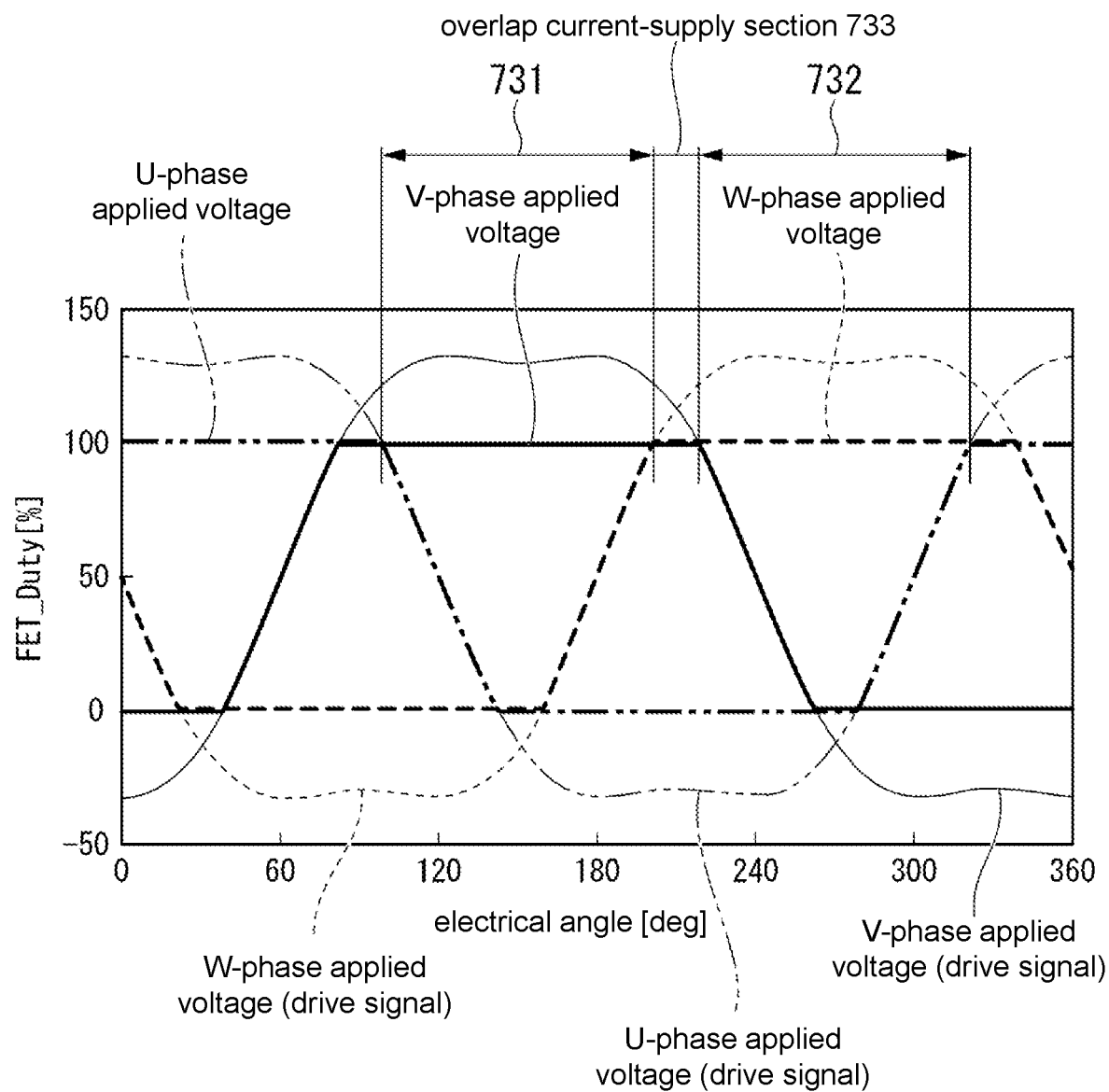
FIG. 7B is a timing chart showing the current-supply timing of each of U phase, V phase, and W phase by the second drive control unit 642 in the embodiment.

In addition, as shown in FIG. 7B, between a current-supply section (a normal current-supply section 731) where only the duty of the applied voltage of V-phase of the three phases is 100% and a current-supply section (a normal current-supply section 732) where only the duty of the applied voltage of W-phase is 100%, the second current-supply signal has a current-supply section (an overlap current-supply section 733) where both the duty of the applied voltage of V-phase and the duty of the applied voltage of W-phase are 100%.

Figure 7C:
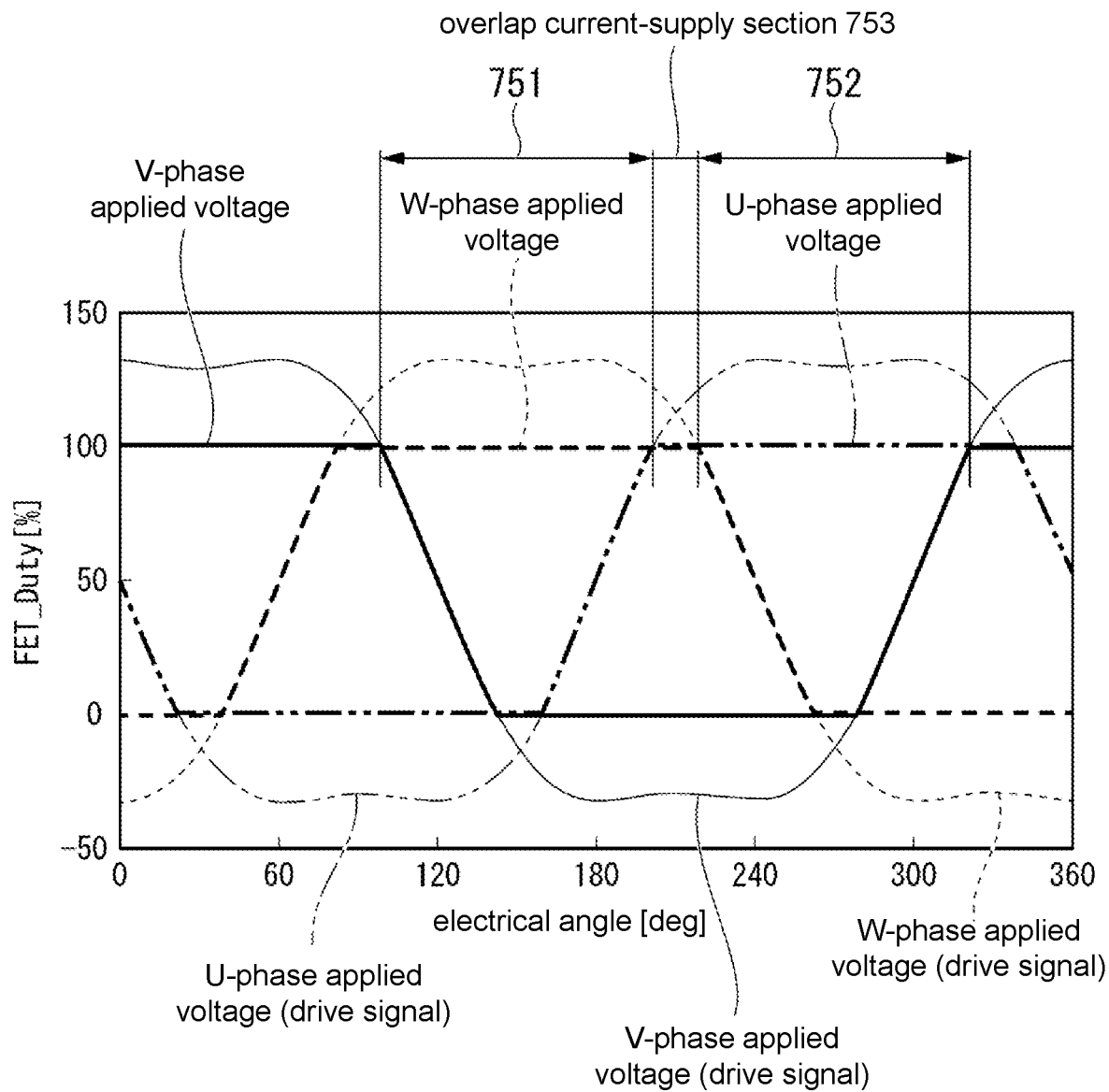
FIG. 7C is a timing chart showing the current-supply timing of each of U phase, V phase, and W phase by the second drive control unit 642 in the embodiment.

In addition, as shown in FIG. 7C, between a current-supply section (a normal current-supply section 751) where only the duty of the applied voltage of W-phase of the three phases is 100% and a current-supply section (a normal current-supply section 752) where only the duty of the applied voltage of U-phase is 100%, the second current-supply signal has a current-supply section (an overlap current-supply section 753) where both the duty of the applied voltage of W-phase and the duty of the applied voltage of U-phase are 100%.

In FIGS. 7A to 7C, it is described that the second current-supply signal is a signal including, between the normal current-supply section where only the duty of the applied voltage of the first phase of the three phases is 100% and the normal current-supply section where only the duty of the applied voltage of the second phase is 100%, the overlap current-supply section where both the duty of the applied voltage of the first phase and the duty of the applied voltage of the second phase are 100%. In other words, it can be said that the second current-supply signal is a signal including, between the normal current-supply section where only the duty of the applied voltage of the first phase of the three phases is 0% and the normal current-supply section where only the duty of the applied voltage of the second phase is 0%, the overlap current-supply section where both the duty of the applied voltage of the first phase and the duty of the applied voltage of the second phase are 0%.

Figure 7D:
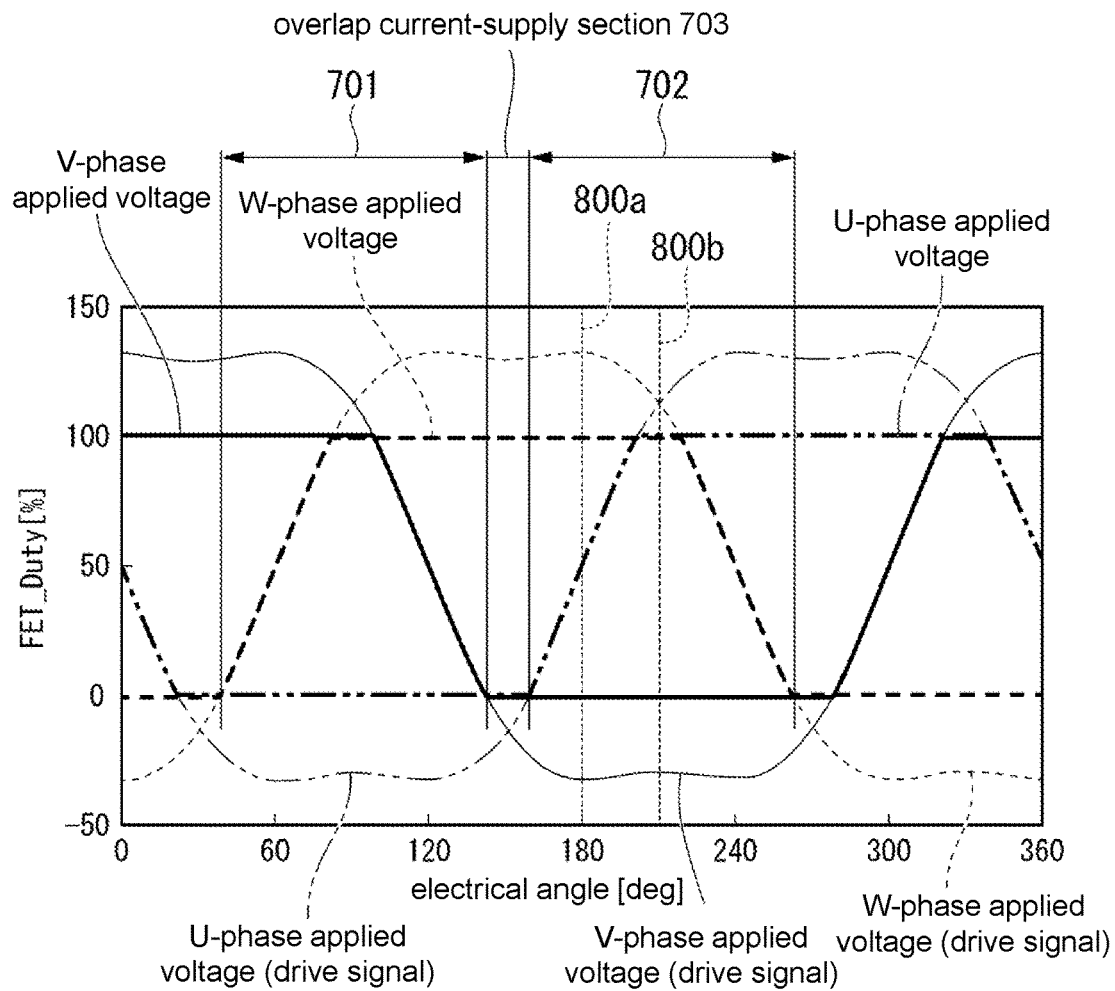
FIG. 7D is a timing chart showing the current-supply timing of each of U phase, V phase, and W phase by the second drive control unit 642 in the embodiment.

Specifically, as shown in FIG. 7D, between a current-supply section (a normal current-supply section 701) where only the duty of the applied voltage of U-phase of the three phases is 0% and a current-supply section (a normal current-supply section 702) where only the duty of the applied voltage of V-phase is 0%, the second current-supply signal has a current-supply section (an overlap current-supply section 703) where both the duty of the applied voltage of U-phase and the duty of the applied voltage of V-phase are 0%. Although not shown, between a current-supply section (a normal current-supply section) where only the duty of the applied voltage of V-phase of the three phases is 0% and a current-supply section (normal current-supply section) where only the duty of the applied voltage of W-phase is 0%, the second current-supply signal has a current-supply section (an overlap current-supply section) where both the duty of the applied voltage of V-phase and the duty of the applied voltage of W-phase are 0%. In addition, between a current-supply section (a normal current-supply section) where only the duty of the applied voltage of W-phase of the three phases is 0% and a current-supply section (a normal current-supply section) where only the duty of the applied voltage of U-phase is 0%, the second current-supply signal has a current-supply section (an overlap current-supply section) where both the duty of the applied voltage of W-phase and the duty of the applied voltage of U-phase are 0%.

In the following descriptions, drive control for supplying a current to the brushless motor 30 by the second current-supply signal may be referred to as the wide-angle trapezoidal wave current-supply drive.

In this way, by outputting the second drive signal to the inverter 52 at the current-supply timing based on the rotational position of the rotor 22 detected by the position detection unit 61, the second drive control unit 642 generates, to the inverter 52, the second current-supply signal for performing the wide-angle trapezoidal wave current-supply drive of the brushless motor 30.

In addition, the wide-angle trapezoidal wave current-supply drive of the brushless motor 30 in the high output mode is to greatly improve the output characteristics of the motor compared with the third harmonic current-supply drive of the brushless motor 30 in the low output mode (hereinafter, referred to as Purpose 1). In addition, the wide-angle trapezoidal wave current-supply drive of the brushless motor 30 in the high output mode is to make it possible to suppress a working sound compared with the rectangular wave drive (the wide-angle current-supply drive in Patent literature 1 and Patent literature 2) of the brushless motor 30 in the high output mode (hereinafter, referred to as Purpose 2).

Hereinafter, the reason why the wide-angle trapezoidal wave current-supply drive of the brushless motor 30 is performed in the high output mode in order to achieve Purpose 1 and Purpose 2 is described using FIG. 8.

FIG. 8 is a diagram for illustrating the principle of improving the output characteristics of the motor by arranging an overlap current-supply section in the second current-supply signal. Moreover, a resistance RW, a resistance RU, and a resistance RV shown in FIG. 8 respectively indicate a reference resistance in a circuit (referred to as a resistance circuit) configured by each of the switching elements 52a to 52f of the inverter 52 and the three-phase armature coils 21u, 21v, and 21w. In addition, the size of arrows shown in FIG. 8 is proportional to the magnitude of a value of the applied current to each phase.

Figure 8A:
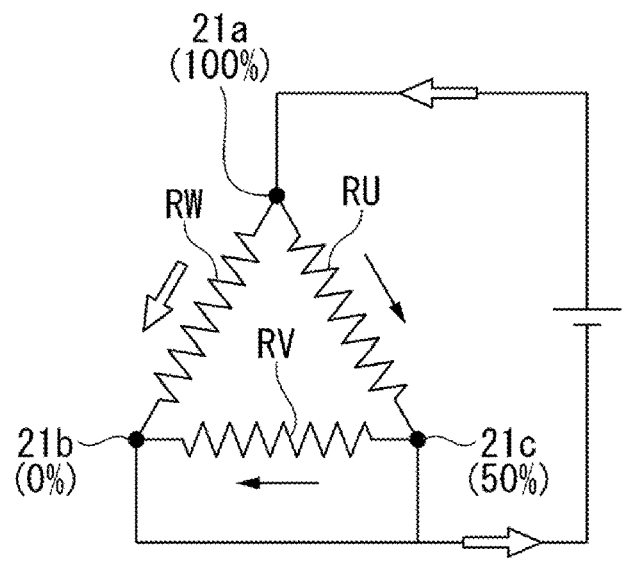
FIG. 8A is a diagram for illustrating the principle of improving the output characteristics of a motor by arranging an overlap current-supply section in a second current-supply signal.

FIG. 8A is a circuit diagram in a current-supply state in the vicinity of an electrical angle of 180° in FIG. 7D (reference sign 800a in FIG. 7D). In the vicinity of the current-supply angle of 180°, a current is supplied to the connection point 21a with a duty of 100% for the W-phase applied voltage, a current is supplied to the connection point 21b with a duty of 0% for the V-phase applied voltage, and a current is supplied to the connection point 21c with a duty of 50% for the U-phase applied voltage.

As shown in FIG. 8A, because a current is supplied to all of the three phases during the drive in the normal current-supply section (three-phase current-supply) in the high output mode, a resistance Ra between terminals in the resistance circuit has a configuration in which the resistance RW (resistance value R) and a series resistance (resistance value 2R) of the resistance RU and the resistance RV are disposed in parallel, and thus Ra=2R/3 is obtained according to the following formula.

$$Ra = R \times 2R/(R+2R) = (2/3)R$$

Note that, the resistance Ra between terminals in the resistance circuit refers to a resistance value between a positive electrode terminal and a negative electrode terminal of the direct current power supply 51 shown in FIG. 4.

Here, comparing the magnitude of the current flowing through the resistance RW and the current flowing through the series resistance of the resistance RU and the resistance RV, the magnitude of the current flowing through the resistance RW is greater than the magnitude of the current flowing through the series resistance of the resistance RU and the resistance RV.

Figure 8B:
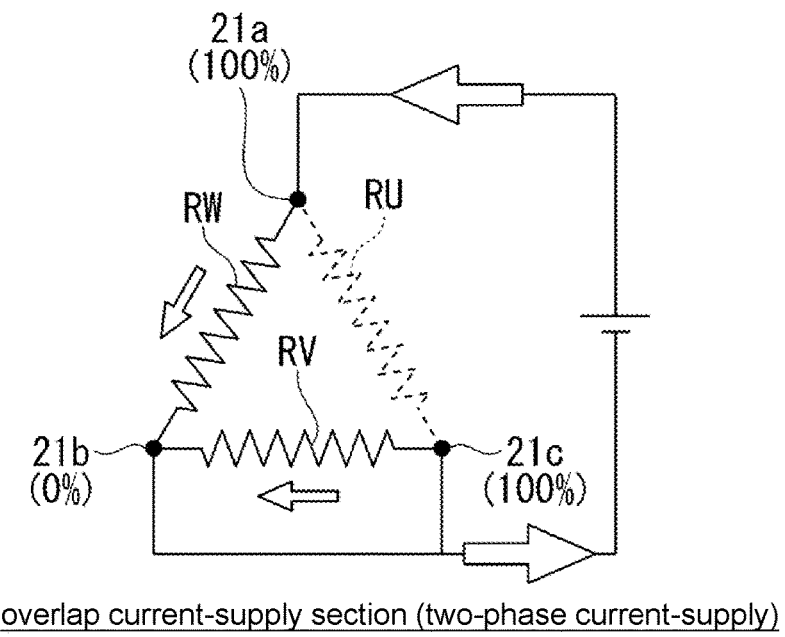
FIG. 8B is a diagram for illustrating the principle of improving the output characteristics of the motor by arranging the overlap current-supply section in the second current-supply signal.

FIG. 8B is a circuit diagram in a current-supply state in the vicinity of an electrical angle of 210° in FIG. 7A (reference character 800b in FIG. 7A).

On the other hand, as shown in FIG. 8B, because a current is supplied to two phases during the drive in the overlap current-supply section (two-phase current supply) in the high output mode, a resistance Rb between terminals in the resistance circuit has a configuration in which the resistance RW (resistance value R) and the resistance RU (resistance value R) are disposed in parallel, and thus Rb=R/2 is obtained according to the following formula.

$$Rb = R \times R/(R+R) = (1/2)R$$

Note that, the resistance Rb between terminals in the resistance circuit refers to a resistance value between the positive electrode terminal and the negative electrode terminal of the direct current power supply 51 shown in FIG. 4.

Here, a current flows through the resistance RW and the resistance RV, but almost no current flows through the resistance RU. In other words, an applied voltage with a duty of 100% is applied to the connection point 21a and the connection point 21c, and an applied voltage with a duty of 0% is applied to the connection point 21b. Therefore, the connection point 21a and the connection point 21c have the same potential, and no current flows between the connection point 21a and the connection point 21c. In addition, a potential difference between the connection point 21a and the connection point 21b is equal to a potential difference between the connection point 21c and the connection point 21b, and the current flowing between the connection point 21a and the connection point 21b is equal to the current flowing between the connection point 21c and the connection point 21b. As a result, the magnitude of the current flowing through the resistance RW and the magnitude of the current flowing through the resistance RV are almost the same, but almost no current flows through the resistance RU, and the brushless motor 30 is not affected by the resistance value of the resistance RU.

Thus, by switching to the overlap current-supply section, the circuit to which a current is supplied changes from three phases to two phases, and the resistance calculation result changes from 2R/3 to R/2, thereby making it possible to reduce the internal resistance of the motor by (2R/3−R/2)/(2R/3)=1/4=25%.

That is, the internal resistance of the motor is lowered, and thereby the output characteristics of the motor are improved due to the effect of reduction in copper loss.

Figure 9:
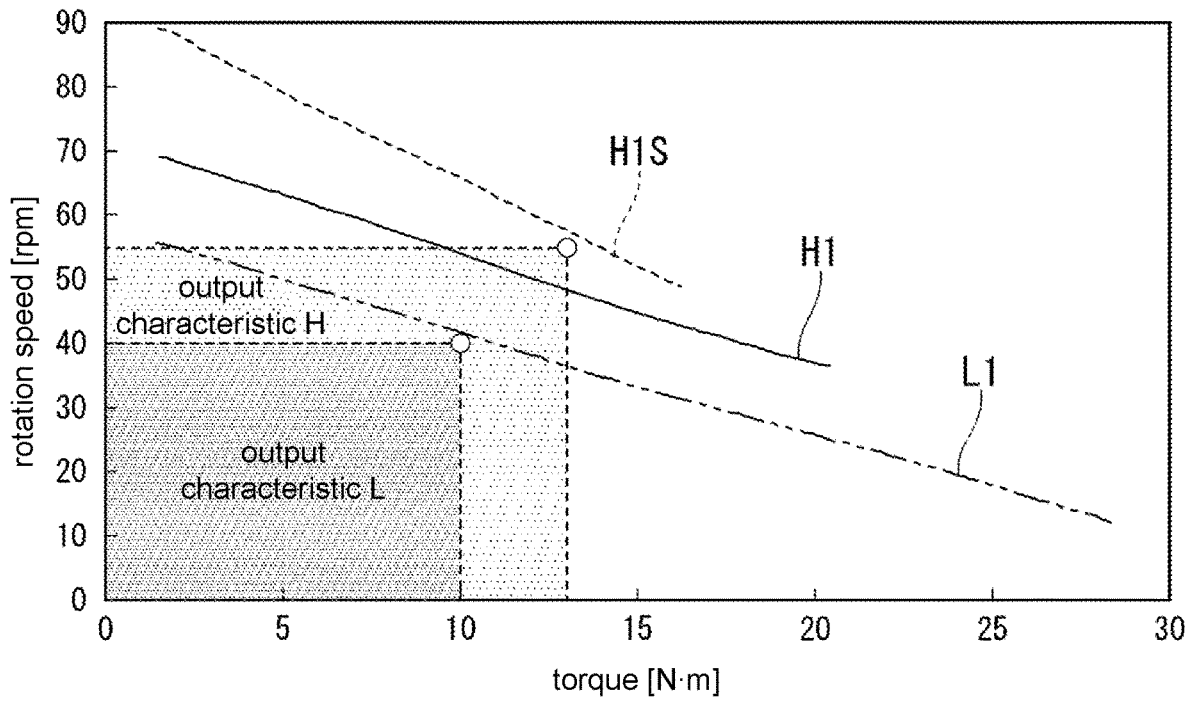
FIG. 9 is a diagram showing the motor characteristics of a brushless motor 30 in a third harmonic current-supply drive and a wide-angle trapezoidal wave current-supply drive in the embodiment.

FIG. 9 is a diagram showing the motor characteristics of the brushless motor 30 in the third harmonic current-supply drive and the wide-angle trapezoidal wave current-supply drive in the embodiment.

In FIG. 9, L1 shows the motor characteristics of the third harmonic current-supply drive. In addition, H1 shows the motor characteristics of the wide-angle trapezoidal wave current-supply drive. In addition, H1S shows the motor characteristics of a wide-angle trapezoidal wave+"advance angle >0°" current-supply drive. Here, the wide-angle trapezoidal wave+"advance angle >0°" current-supply drive refers to a wide-angle trapezoidal wave current-supply drive in which the second current-supply signal is output at a current-supply timing that is advanced by a predetermined electrical angle with reference to the rotational position of the rotor 22, and each of the three phases of the brushless motor is sinusoidally driven.

In addition, the region indicated by an output characteristic L shows the motor characteristics in one wiping cycle required in the low-speed working mode at a low vehicle speed. In addition, the region indicated by an output characteristic H shows the motor characteristics in one wiping cycle required in the high-speed working mode during high-speed traveling.

As shown in FIG. 9, the drive control unit 64 can satisfy the motor characteristics in the one-wiping cycle required in the low-speed working mode by performing the third harmonic current-supply drive in the low output mode.

In addition, the drive control unit 64 executes the wide-angle trapezoidal wave current-supply drive when shifting from the low output mode to the high output mode. That is, the drive control unit 64 can increase the rotation speed of the brushless motor 30, prevent the decrease in torque due to the increase in the rotation speed, and generate high torque by the wide-angle trapezoidal wave current-supply drive and the wide-angle trapezoidal wave+"advance angle >0°" current-supply drive, compared with the third harmonic current-supply drive in the low output mode. That is, it can be said that Purpose 1 described above is achieved. In addition, the drive control unit 64 can satisfy the motor characteristics in the one-wiping cycle required in the high-speed working mode by performing the wide-angle trapezoidal wave current-supply drive and/or the wide-angle trapezoidal wave+"advance angle >0°" current-supply drive.

Figure 10:
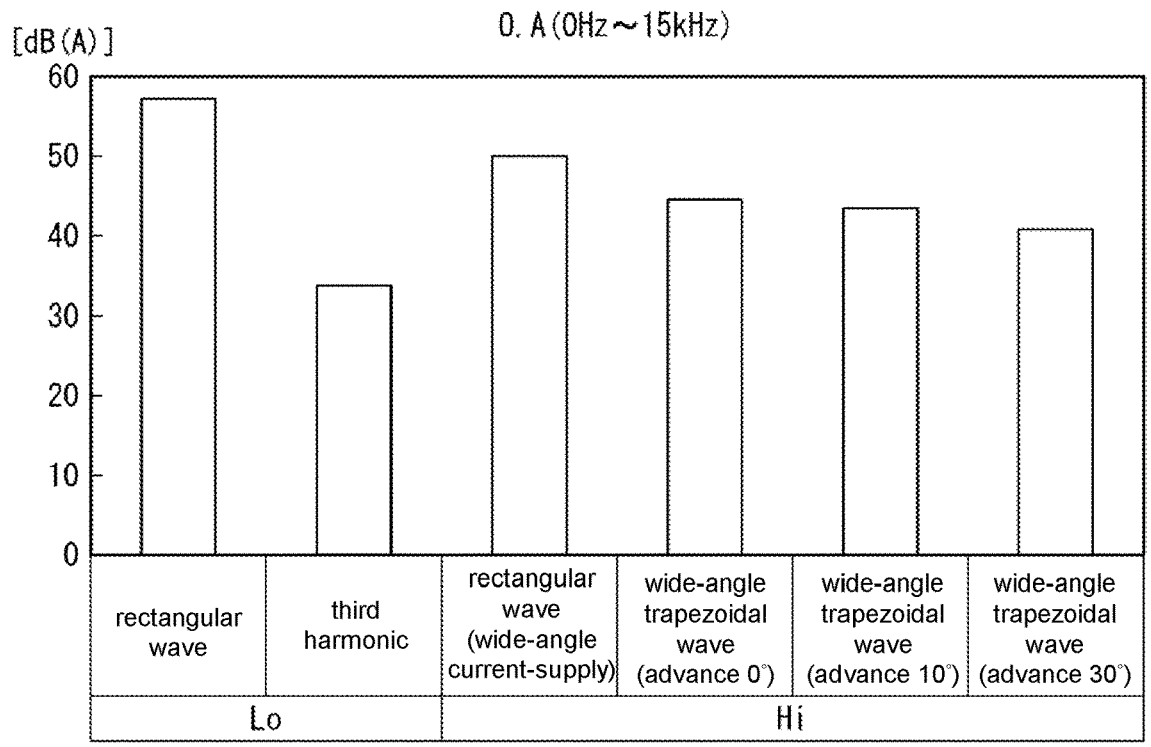
FIG. 10 is a diagram showing the characteristics of a working sound of the brushless motor 30 in the drive control used in a low output mode or a high output mode.
Figure 11:
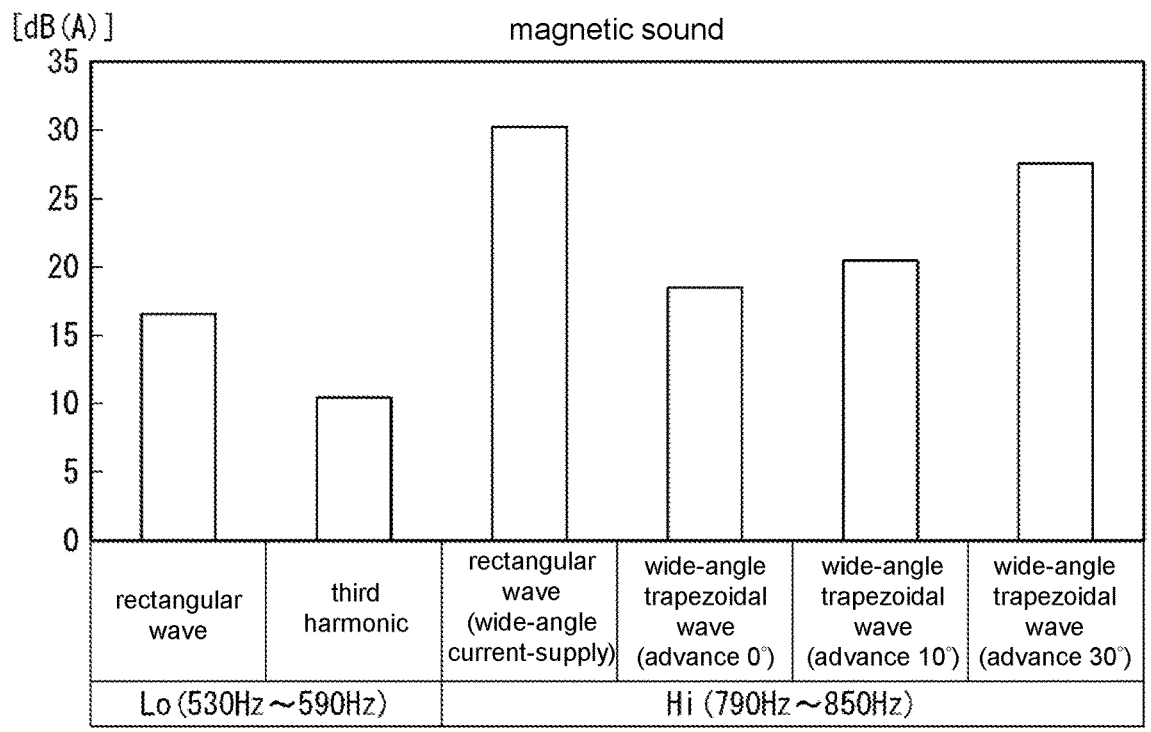
FIG. 11 is a diagram showing the characteristics of the working sound of the brushless motor 30 in the drive control used in the low output mode or the high output mode.

FIGS. 10 and 11 are diagrams showing the characteristics of the working sound of the brushless motor 30 in the drive control used in the low output mode or the high output mode. FIG. 10 shows an O.A (Over All) value which is obtained in a way that the drive control of the brushless motor 30 is performed by the following six drive controls (first to sixth drive controls) in the low (Lo) output mode or the high (Hi) output mode, and fast fourier transform (FFT) is performed on the working sound corresponding to the rotation frequency of the rotor 22 in a frequency band (0 to 15 KHz). Here, the O.A value is a value used for simply evaluating whether the sound is noisy or quiet without paying attention to the frequency characteristics.

In addition, FIG. 11 shows a value which is obtained in a way that the drive control of the brushless motor 30 is performed by the following six drive controls (the first to sixth drive controls) in the low output mode or the high output mode, and a magnetic sound that is the working sound corresponding to the rotation frequency of the rotor 22 is measured when the rotation frequency of the rotor 22 is 530 Hz to 590 Hz (in the Lo output mode) or 790 Hz to 850 Hz (in the Hi output mode).

(First Drive Control)
The first drive control is a drive control performed by the rectangular wave drive in the low output mode, and corresponds to the rectangular wave drive of Patent literature 1.

(Second Drive Control)
The second drive control is a drive control performed by the third harmonic drive (sine wave drive) in the low output mode, and corresponds to the sine wave drive of Patent literature 2 and the embodiment.

(Third Drive Control)
The third drive control is a drive control performed by rectangular wave current-supply (wide-angle current-supply) in the high output mode, and corresponds to the rectangular wave drive of Patent literature 2.

(Fourth Drive Control)
The fourth drive control is a drive control performed by the wide-angle trapezoidal wave current-supply drive (sine wave drive) in the high output mode, and corresponds to the sine wave drive of the embodiment.

(Fifth Drive Control)
The fifth drive control is a drive control performed by a wide-angle trapezoidal wave+"advance angle 10°" current-supply drive (sine-wave drive) in the high output mode, and corresponds to the sine wave drive of the embodiment.

(Sixth Drive Control)
The sixth drive control is a drive control performed by wide-angle trapezoidal wave+"advance angle 30°" current-supply drive (sine-wave drive) in the high output mode, and corresponds to the sine wave drive of the embodiment.

As shown in FIGS. 10 and 11, it can be seen that in the low output mode, the working sound is suppressed more with the O.A value and the magnetic sound in the second drive control than in the first drive control.

In addition, it can be seen that in the high output mode, the working sound is suppressed more in the fourth to sixth drive controls than in the third drive control.

That is, the following problem of Patent literature 2 can be solved: a sound pressure difference between the working sound of the brushless motor in the low-speed working mode and the working sound of the brushless motor in the high-speed working mode is great, and the sound pressure of the brushless motor in the high-speed working mode is extremely higher than the sound pressure of the brushless motor in the low-speed working mode. In other words, in the embodiment, by performing the drive control with the wide-angle trapezoidal wave current-supply drive in the high output mode, the working sound can be suppressed compared with the case in which the drive control (the rectangular wave current supply (wide-angle current supply) of Patent literature 2) is performed by the rectangular wave current supply (wide-angle current supply) in the high output mode. That is, it can be said that Purpose 2 described above is achieved.

Moreover, when acquiring the stop signal from the mode determination unit 63, the drive control unit 64 stops the drive of the brushless motor 30 performed by the first drive control unit 641 or the second drive control unit 642. That is, when acquiring the stop signal from the mode determination unit 63, the drive control unit 64 stops the drive of the brushless motor 30 and stops the swing action of the wiper arms 14 and 16.

Next, a method in which the inverter 52 generates the second current-supply signal in the high output mode is described. In the following descriptions, the duty of the applied voltage applied from the inverter 52 to each phase of the armature coils 21u, 21v, and 21w is set as FET_Duty [%], and the duty indicated by a command value of the applied voltage applied to each phase by the inverter 52 is expressed as Software_Duty [%], the command value being included in the instruction signal output from the control unit 54 (the second drive control unit 642) to the inverter 52. As described above, when in the low output mode, as shown in FIG. 6, the motor control device 33 is set in a way that the FET_Duty is about 100% at the peak of the third harmonic superimposed wave and the FET_Duty is about 0% at the valley.

As shown in FIGS. 7A to 7D, in the high output mode, the second current-supply signal is a wide-angle trapezoidal wave. In other words, the second current-supply signal has such a waveform that in a waveform in which the amplitude of the first current-supply signal is changed to a value larger than 50% in the FET_Duty, the FET_Duty is set to 100% in a current-supply section where the FET_Duty is 100% or more, and the FET_Duty is set to 0% in a current-supply section where the FET_Duty is 0% or less.

In other words, when in the high output mode, the motor control device 33 is set in a way that the FET_Duty has a value greater than 100% (for example, any duty in the range up to about 130% that exceeds 100%) at the peak of the third harmonic superimposed wave, and the FET_Duty has a value less than 0% (for example, any duty in the range up to about −30% that is below 0%) at the valley. Actually, the maximum value of the applied voltage that can be physically output by the inverter 52 is the applied voltage corresponding to the FET_Duty=100%, and the minimum value is the applied voltage corresponding to the FET_Duty=0%. Therefore, the inverter 52 outputs the applied voltage corresponding to the FET_Duty=100% in the current-supply section where the FET_Duty is set to a value greater than 100%. In addition, the inverter 52 outputs the applied voltage corresponding to the FET_Duty=0% in the current-supply section where the FET_Duty is set to a value less than 0%. Accordingly, in the vicinity of the peak and valley of the third harmonic superimposed wave, a section where the applied voltage has a constant value can be generated, and a wide-angle trapezoidal wave can be generated.

Figure 12:
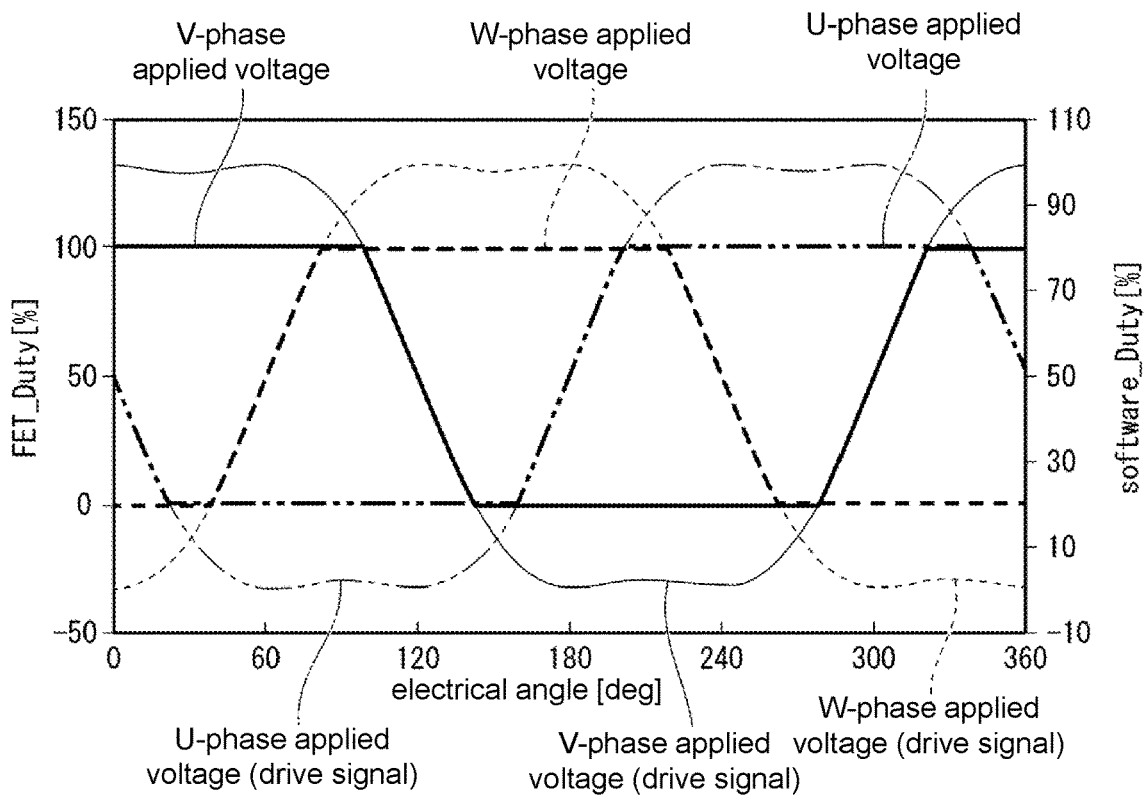
FIG. 12 is a timing chart showing the current-supply timing of each of U phase, V phase, and W phase by the second drive control unit 642 in the embodiment.
Figure 13:
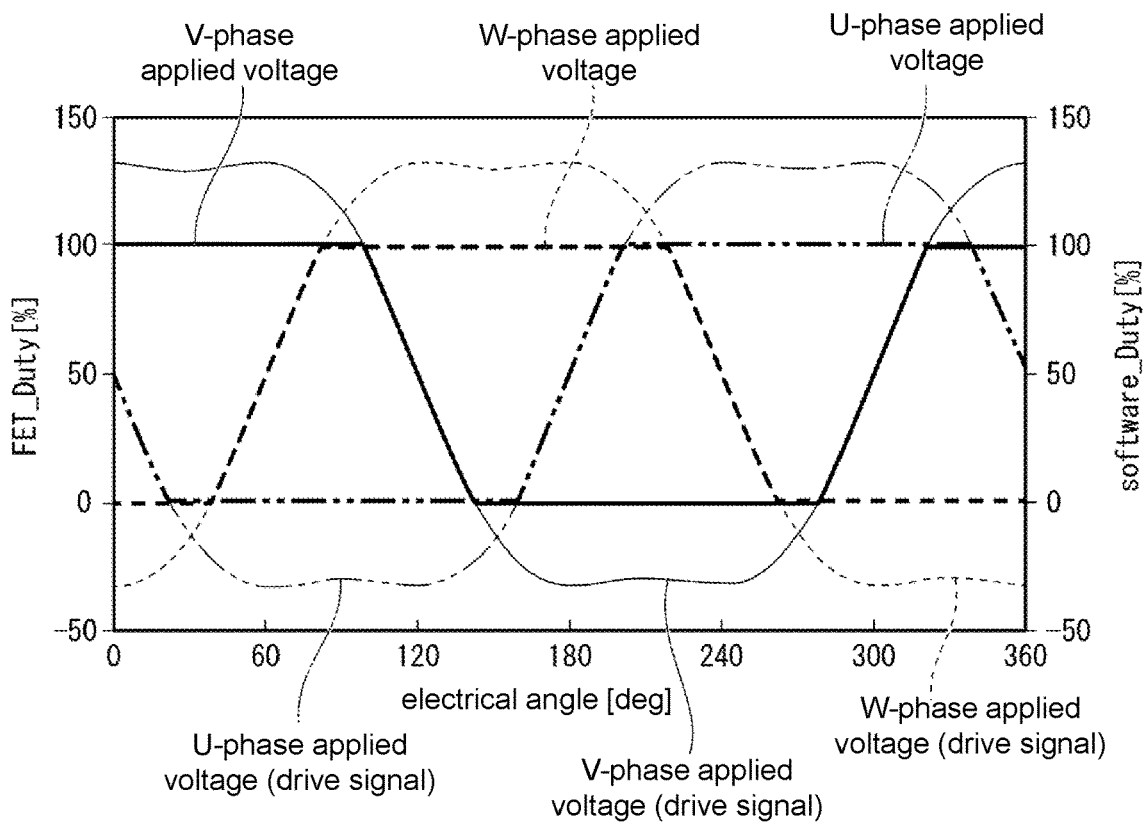
FIG. 13 is a timing chart showing variations of software in the embodiment.

This is described using FIGS. 12 and 13.

FIG. 12 is a timing chart showing the current-supply timing of each of U phase, V phase, and W phase by the second drive control unit 642 in the embodiment. FIG. 13 is a timing chart showing variations of software in the embodiment.

Similar to FIGS. 7A to 7D, the angles from 0° to 360° shown on the horizontal axis of FIGS. 12 and 13 are electrical angles representing the current-supply period within one cycle of the second current-supply signal. In addition, the first vertical axis (the vertical axis on the left side in the drawing) represents the FET_Duty [%]. In addition, the second vertical axis (the vertical axis on the right side in the drawing) represents the software_Duty [%].

Here, FIG. 12 shows an example when scales which are respectively recognized by the software and the FET are made different, wherein the software is used when the inverter 52 performs the control action according to a command of the control unit 54, and the FET applies the applied voltage to each of U phase, V phase, and W phase. When the software_Duty [%]=80 to 100%, the FET_Duty [%]=100 to 130%, but the apparent FET_Duty [%] (the duty of the applied voltage actually applied to each phase) is 100% as shown by a thick line in FIG. 12.

In addition, FIG. 13 shows an example in the case where the software used when the inverter 52 performs the control action according to a command of the control unit 54 is set to enable the output with a duty of 100% or more. When the software_Duty [%]=100 to 130%, the FET_Duty [%]=100 to 130%, but the apparent FET_Duty [%] (the duty of the applied voltage actually applied to each phase) is 100% as shown by a thick line in FIG. 13.

Figure 14:
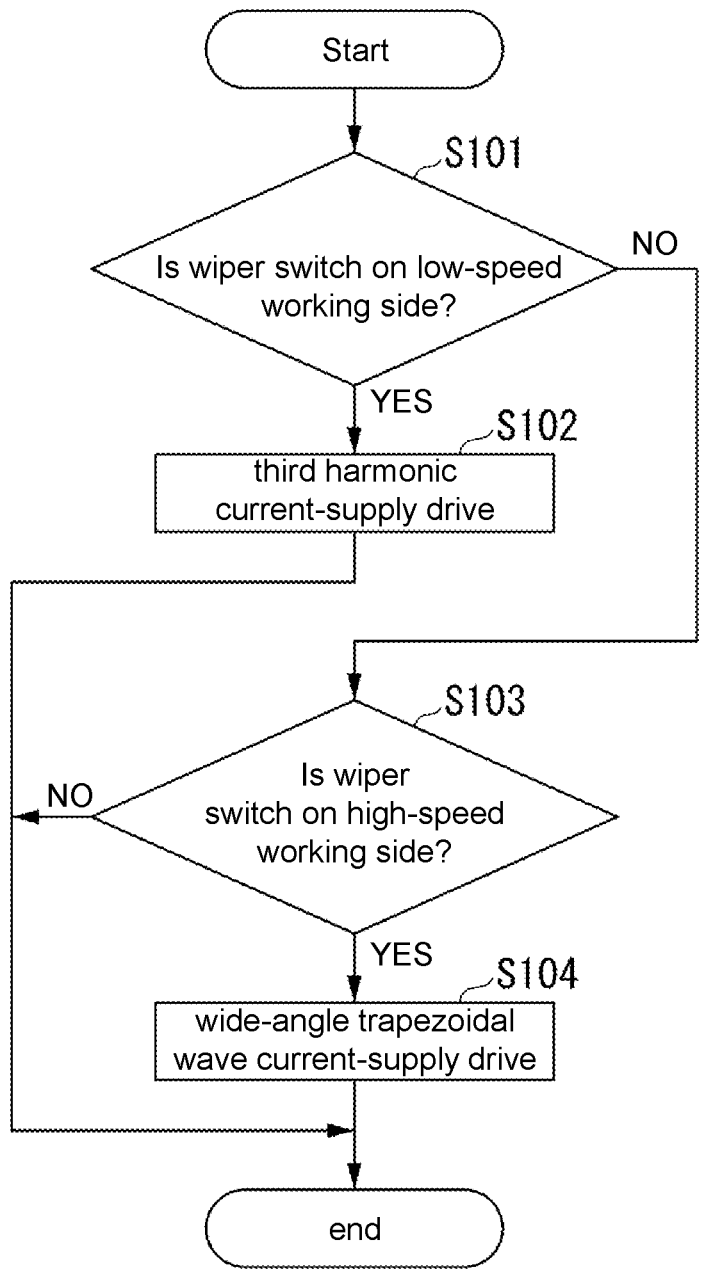
FIG. 14 is a diagram illustrating a processing flow of the control unit 54 in the embodiment.
Figure 15:
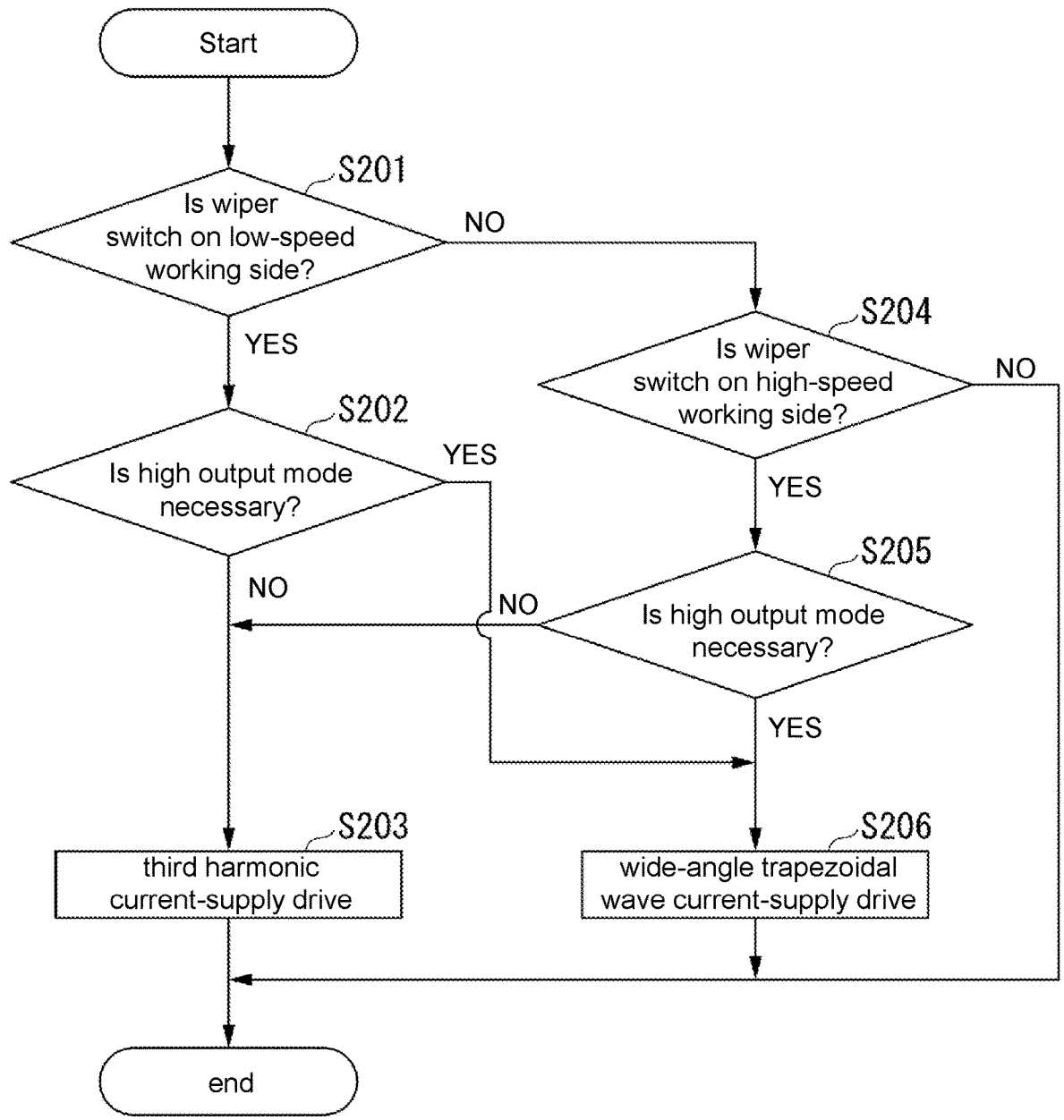
FIG. 15 is a diagram illustrating a variation example of the processing flow of the control unit 54 in the embodiment.

Hereinafter, a processing flow of the control unit 54 in the embodiment is described using FIGS. 14 and 15. FIG. 14 is a diagram illustrating the processing flow of the control unit 54 in the embodiment. FIG. 15 is a diagram illustrating a variation example of FIG. 14 in the embodiment.

The control unit 54 determines whether or not the wiper switch 37 is operated by the driver to the low-speed working side (step S101). For example, when acquiring the low-speed working mode signal from the wiper switch 37, the control unit 54 determines that the wiper switch 37 is operated to the low-speed working side. When the wiper switch 37 is operated to the low-speed working side by the driver, the control unit 54 performs the third harmonic current-supply drive of the brushless motor 30 (step S102).

On the other hand, when the wiper switch 37 is not operated to the low-speed working side by the driver, the control unit 54 determines whether or not the wiper switch 37 is operated to the high-speed working side (step S103). For example, when acquiring the high-speed working mode signal from the wiper switch 37, the control unit 54 determines that the wiper switch 37 is operated to the high-speed working side. When the wiper switch 37 is operated to the high-speed working side by the driver, the control unit 54 performs the wide-angle trapezoidal wave current-supply drive of the brushless motor 30 (step S104).

In addition, the processing flow of the control unit 54 in the embodiment shown in FIG. 14 may be set to the processing flow of the control unit 54 shown in FIG. 15.

The control unit 54 determines whether or not the wiper switch 37 is operated to the low-speed working side by the driver (step S201). For example, when acquiring the low-speed working mode signal from the wiper switch 37, the control unit 54 determines that the wiper switch 37 is operated to the low-speed working side. When the wiper switch 37 is operated to the low-speed working side by the driver, the control unit 54 determines whether or not the high output mode is necessary (step S202). When the control unit 54 determines that the high output mode is not necessary, the control unit 54 performs the third harmonic current-supply drive of the brushless motor 30 (step S203).

On the other hand, when the wiper switch 37 is not operated to the low-speed working side by the driver, the control unit 54 determines whether or not the wiper switch 37 is operated to the high-speed working side (step S204). For example, when acquiring the high-speed working mode signal from the wiper switch 37, the control unit 54 determines that the wiper switch 37 is operated to the high-speed working side. When the wiper switch 37 is operated to the high-speed working side by the driver, the control unit 54 determines whether or not the high output mode is necessary (step S205). When the control unit 54 determines that the high output mode is necessary, the control unit 54 performs the wide-angle trapezoidal wave current-supply drive of the brushless motor 30 (step S206).

Furthermore, when the control unit 54 determines that the wiper switch 37 is operated to the low-speed working side in the processing of step S201 and determines that the high output mode is necessary in the processing of step S202, the control unit 54 performs the wide-angle trapezoidal wave current-supply drive of the brushless motor 30. In addition, when the control unit 54 determines that the wiper switch 37 is operated to the high-speed working side in the processing of step S204 and determines that the high output mode is not necessary in the processing of step S205, the control unit 54 performs the third harmonic current-supply drive of the brushless motor 30.

By such configuration, the control unit 54 can appropriately switch between the low output mode and the high output mode regardless of whether the wiper switch 37 is on the low-speed working side or the high-speed working side. Accordingly, it is possible to respond to changes in the external environment such as changes in the amount of rainfall, and changes in the conditions on the front glass 11 (wiping surface) due to changes in vehicle speed.

As described above, in the embodiment, the motor control device 33 performs the third harmonic current-supply drive of the brushless motor 30 in the low output mode in which the output of the brushless motor 30 is low, and supplies a current to the brushless motor 30 by the wide-angle trapezoidal wave current-supply drive in the high output mode in which the output is higher than that in the low output mode. In this way, the motor control device 33 performs the third harmonic current-supply drive in the low-speed working mode that is frequently used, and thereby the efficiency is high and the working sound can be reduced compared with those in the rectangular wave current supply control described in Patent literature 1 (see FIG. 11).

In addition, in the high-speed working mode in which high characteristics are necessary, the motor control device 33 performs the wide-angle trapezoidal wave current-supply drive, and thereby can improve the motor characteristics and satisfy the motor characteristics required in the high-speed working mode compared with the case of the sine-wave drive in the low-speed working mode (see FIG. 9). Furthermore, the efficiency is high and the working sound can be reduced compared with those in the rectangular wave current supply control (wide-angle current-supply drive) described in Patent literature 2 (see FIG. 11).

In the above embodiment, the motor unit 19 is described which includes the brushless motor 30 that is a brushless wiper motor making the wiper arm swing and the motor control device 33. A motor unit which is configured by the following brushless motor and motor control device may be used.

(Sunroof Motor Unit)
A sunroof motor unit is configured by: a brushless motor which is a brushless sunroof motor that performs the opening/closing drive of the roof panel arranged on the roof of the vehicle; and a motor control device to which the switching control in the embodiment is applied according to the time when the vehicle is stopped (low load) and the time when the vehicle is traveling (high load).

(Power Seat Motor Unit)
A power seat motor unit is configured by: a brushless motor which is a brushless power seat motor that drives the vehicle seat; and a motor control device which performs the current-supply drive by the first current-supply signal (applied voltage) in fine adjustment of the seat position (adjustment of position and angle of the seat), performs the current-supply drive by the second current-supply signal (applied voltage) in significant changes and the like of the seat position (prevention of a submarine effect when getting in the rear seat and during the vehicle collision), and performs switching control of the two types of current supply.

(Fan Motor Unit)
A fan motor unit is configured by: a brushless motor which is a brushless fan motor used as a drive source for a radiator cooling device of the vehicle; and a motor control device which supports variable speeds, performs the current-supply drives by the first current-supply signal and the second current-supply signal, and performs switching control of the two types of current supply.

(Power Slide Door Motor Unit)
A power slide door motor unit is configured by: a brushless motor which is a brushless power slide door motor used as an electric motor for opening/closing a slide door of the vehicle; and a motor control device which performs the current-supply drives by the first current-supply signal and the second current-supply signal, and performs switching control of the two types of current supply.

Here, variation examples of the processing flow of the control unit 54 when the motor unit 19 described above is applied to a sunroof unit are described using FIGS. 16 to 20. The descriptions of the schematic configuration diagram regarding the configuration for controlling a sunroof are omitted here, but are equivalent to the descriptions in which the "wiper switch 37" in FIGS. 4 and 5 is replaced with a "sunroof operator". The sunroof unit includes a sunroof and a sunroof operator that opens/closes the sunroof. The control unit 54 acquires an operation signal based on the operation of the sunroof operator from the sunroof operator, and opens/closes the sunroof according to the acquired operation signal. The sunroof operator may be, for example, a switch that specifies an action of opening/closing, or an operation panel such as a touch panel or the like.

Figure 16:
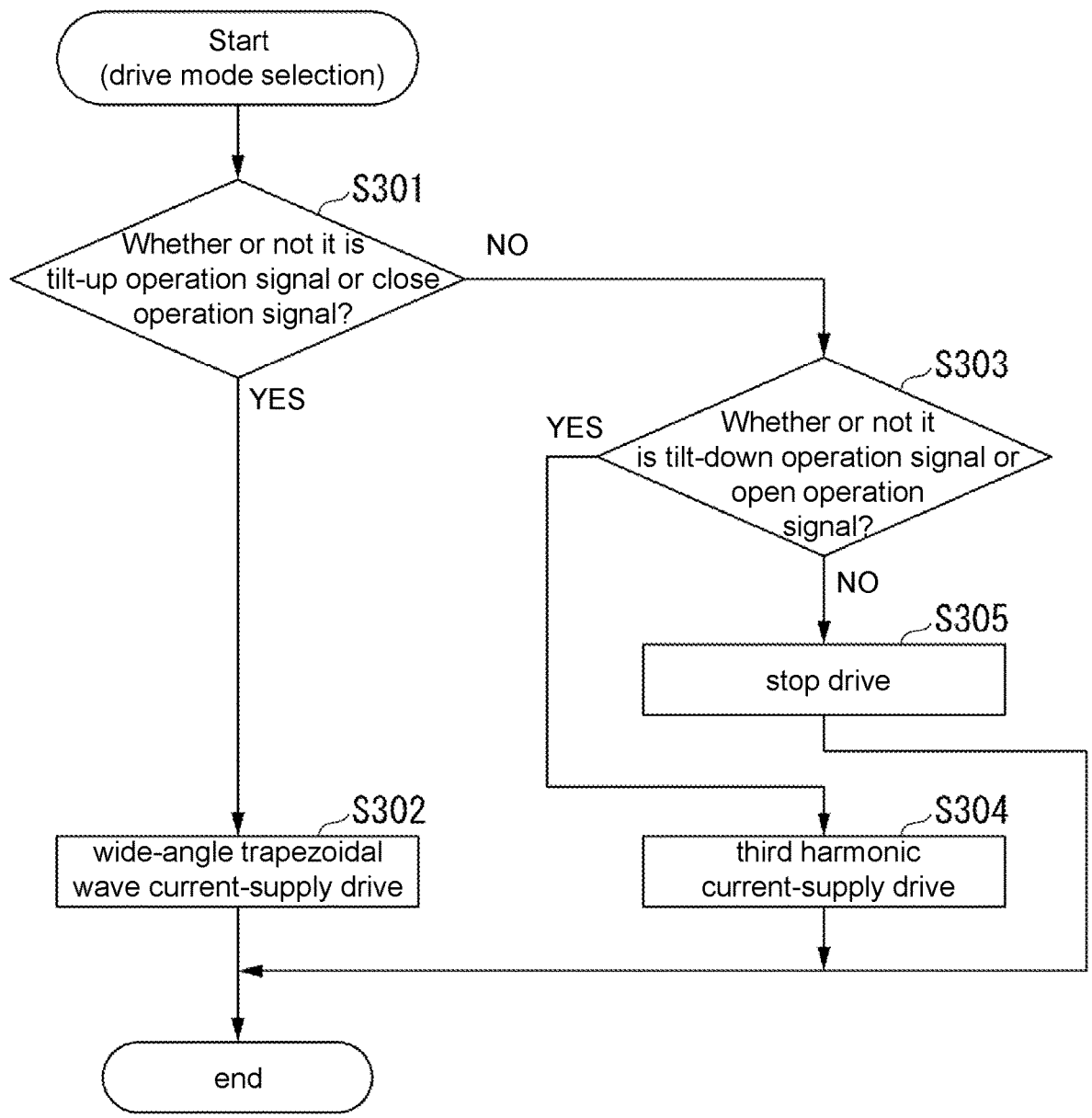
FIG. 16 is a diagram illustrating a variation example of the processing flow of the control unit 54 when the motor unit 19 is applied to a sunroof unit.

FIG. 16 is a diagram illustrating a variation example of the processing flow of the control unit 54 when the motor unit 19 is applied to the sunroof unit.

For example, when the sunroof operator is operated by the driver, the control unit 54 acquires an operation signal from the sunroof operator, and determines whether or not the acquired operation signal is an operation signal for performing a tilt-up operation or an operation signal for performing a close operation (step S301).

When the operation signal is the operation signal for performing the tilt-up operation or the operation signal for performing the close operation (step S301—YES), the control unit 54 executes the tilt-up action or the close action by performing the wide-angle trapezoidal wave current-supply drive of the brushless motor 30 (step S302). Accordingly, when the operation signal indicates the tilt-up operation, the tilt-up action is performed by performing the wide-angle trapezoidal wave current-supply drive of the motor unit 19. In addition, when the operation signal indicates the close operation, the close action is performed by performing the wide-angle trapezoidal wave current-supply drive of the motor unit 19. Note that, the tilt-up action is, for example, an action in which the sunroof is tilted upward to open, and the close action is an action in which the sunroof is closed.

On the other hand, when the operation signal is not the operation signal for performing the tilt-up operation or the operation signal for performing the close operation in step S301 (step S301—NO), the control unit 54 determines whether or not the operation signal is an operation signal for performing a tilt-down operation or an operation signal for performing an open operation (step S303).

When the operation signal is the operation signal for performing the tilt-down operation or the operation signal for performing the open operation (step S303—YES), the control unit 54 executes the tilt-down action or the open action by performing the third harmonic current-supply drive of the motor unit 19 (step S304). Accordingly, when the operation signal indicates the tilt-down operation, the control unit 54 executes the tilt-down action by performing the third harmonic current-supply drive of the motor unit 19. In addition, when the operation signal indicates the open operation, the control unit 54 executes the open action by performing the third harmonic current-supply drive of the motor unit 19. The tilt-down operation is an action of closing the sunroof by returning the tilt of the tilted-up sunroof to the original position, and the open operation is an action of opening the sunroof by moving the sunroof to a fully open position.

On the other hand, when the operation signal is not the operation signal for performing the tilt-down operation or the operation signal for performing the open operation in step S303 (step S303—NO), the control unit 54 determines that any one of failure, emergency stop, and the like occurs in which an unexpected operation input is made, and the control unit 54 stops the drive (step S305).

In this way, the control unit 54 performs the wide-angle trapezoidal wave current-supply drive in the tilt-up action or the close action, and performs the third harmonic current-supply drive in the tilt-down action or the open action. Accordingly, during the traveling of the vehicle, when the tilt-up action or the close action is performed, it is difficult to perform the tilt-down action or the action of closing the sunroof due to wind pressure compared with the case where the tilt-down action or the open action is performed; however, by performing the wide-angle trapezoidal wave current-supply drive, the motor unit 19 can be made to act smoothly even in this situation.

Figure 17:
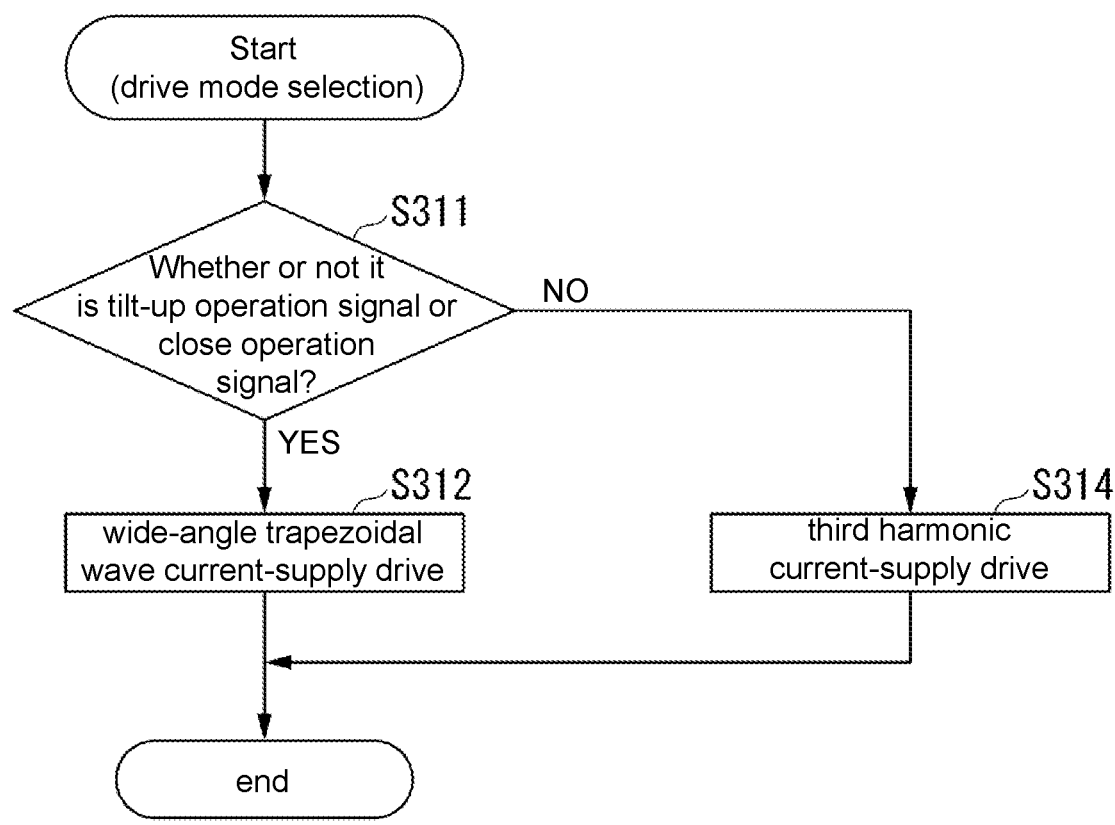
FIG. 17 is a diagram illustrating a variation example of the processing flow of the control unit 54 when the motor unit 19 is applied to the sunroof unit.

FIG. 17 is a diagram illustrating a variation example of the processing flow of the control unit 54 when the motor unit 19 is applied to the sunroof unit.

When the sunroof operator is operated by the driver, the control unit 54 acquires an operation signal from the sunroof operator, and determines whether or not the acquired operation signal is the operation signal for performing the tilt-up operation or the operation signal for performing the close operation (step S311).

When the operation signal is the operation signal for performing the tilt-up operation or the operation signal for performing the close operation (step S311—YES), the control unit 54 executes the tilt-up action or the close action by performing the wide-angle trapezoidal wave current-supply drive of the brushless motor 30 (step S312). Accordingly, when the operation signal indicates the tilt-up operation, the control unit 54 performs the tilt-up action by performing the wide-angle trapezoidal wave current-supply drive of the motor unit 19. In addition, when the operation signal indicates the close operation, the motor unit 19 performs the close action by performing the wide-angle trapezoidal wave current-supply drive of the motor unit 19.

On the other hand, when the operation signal is not the operation signal for performing the tilt-up operation or the operation signal for performing the close operation in step S311 (step S311—NO), the control unit 54 executes an action based on the operation content by performing the third harmonic current-supply drive of the motor unit 19 (step S314). Here, there are only four types of operation content, namely "tilt-up", "close", "tilt-down", and "open". When any operation input of the four types of operation content is accepted, and when it is determined as NO in step S311, either the "tilt-down" action or the "open" action may be executed. Therefore, by performing the third harmonic current-supply drive, the control unit 54 can perform the tilt-down action or the open action as the action that is performed when it is determined as NO in step S311.

Figure 18:
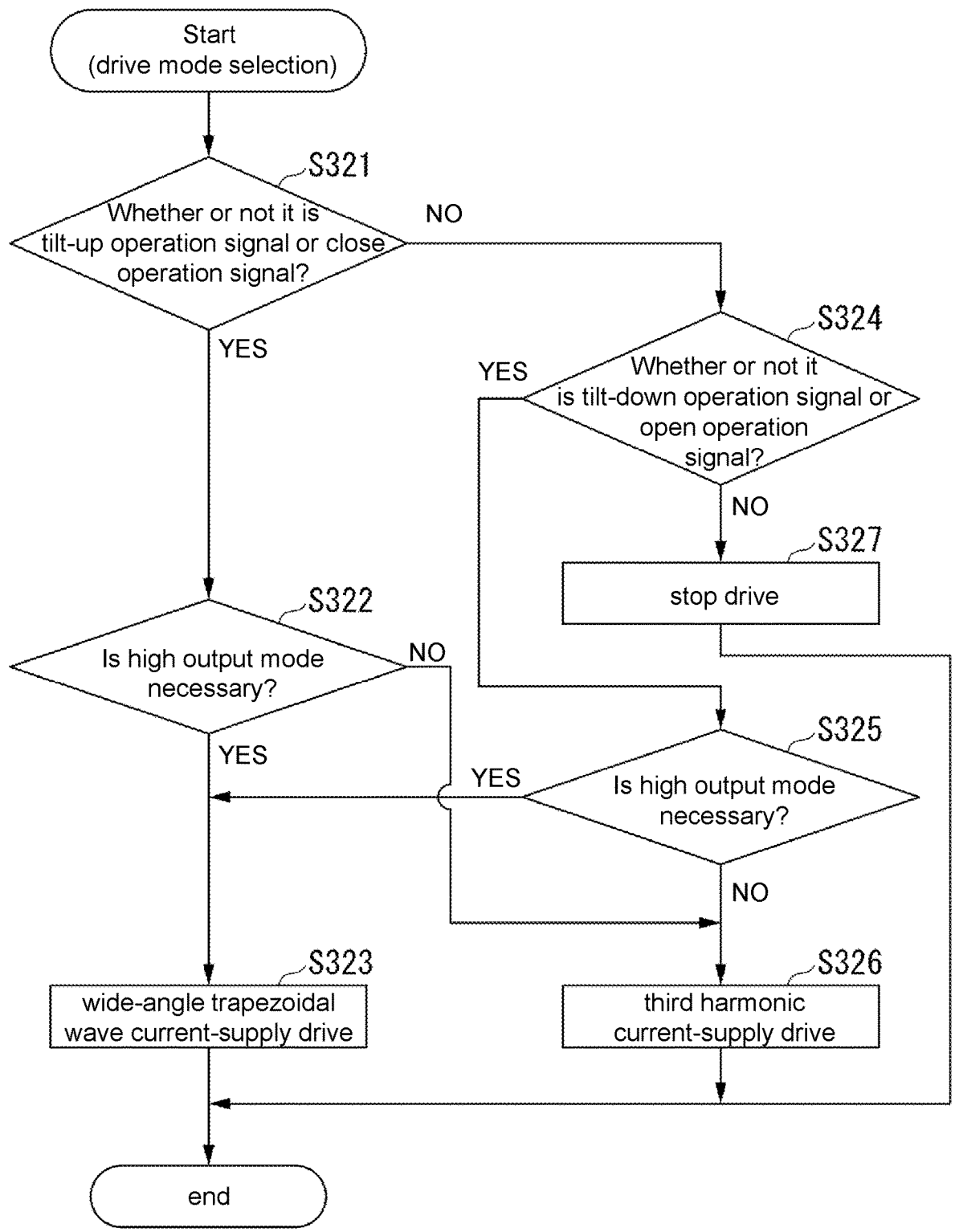
FIG. 18 is a diagram illustrating a variation example of the processing flow of the control unit 54 when the motor unit 19 is applied to the sunroof unit.

FIG. 18 is a diagram illustrating a variation example of the processing flow of the control unit 54 when the motor unit 19 is applied to the sunroof unit.

When the sunroof operator is operated by the driver, the control unit 54 acquires an operation signal from the sunroof operator, and determines whether or not the acquired operation signal is the operation signal for performing the tilt-up operation or the operation signal for performing the close operation (step S321).

When the operation signal is the operation signal for performing the tilt-up operation or the operation signal for performing the close operation (step S321—YES), the control unit 54 detects the vehicle speed or the load of the brushless motor 30 of the motor unit 19, and determines whether or not it is a state in which the high output mode is necessary based on the detection result (step S322). The determination is for determining, for example, whether or not the vehicle speed exceeds a vehicle speed reference value, or whether or not the load of the brushless motor 30 exceeds a load reference value. This determination may be made based on only one of whether or not the vehicle speed exceeds the vehicle speed reference value, and whether or not the load of the brushless motor 30 exceeds the load reference value. The vehicle speed reference value and the load reference value may be previously stored in, for example, an internal or external storage device of the control unit 54 for reference.

When the vehicle speed exceeds the vehicle speed reference value or when the load of the brushless motor 30 exceeds the load reference value, the control unit 54 determines that the high output mode is necessary (step S322—YES), and executes the tilt-up action or the close action by performing the wide-angle trapezoidal wave current-supply drive of the brushless motor 30 (step S322). Accordingly, when the operation signal indicates the tilt-up operation, the control unit 54 performs the tilt-up action by performing the wide-angle trapezoidal wave current-supply drive of the motor unit 19. In addition, when the operation signal indicates the close operation, the close action is performed by performing the wide-angle trapezoidal wave current-supply drive of the motor unit 19.

On the other hand, when the vehicle speed does not exceed the vehicle speed reference value or when the load of the brushless motor 30 does not exceed the load reference value, the control unit 54 determines that the high output mode is not necessary (step S322—NO), and executes the tilt-up action or the close action by performing the third harmonic current-supply drive of the brushless motor 30 (step S326). Accordingly, when the operation signal indicates the tilt-up operation, the control unit 54 performs the tilt-up action by performing the third harmonic current-supply drive of the motor unit 19. In addition, when the operation signal indicates the close operation, the close action is performed by performing the third harmonic current-supply drive of the motor unit 19. Accordingly, even in the case of the tilt-up action or the close action, the drive can be performed by the third harmonic current-supply drive in a situation where the high output mode is not necessary.

On the other hand, when the operation signal is not the operation signal for performing the tilt-up operation or the operation signal for performing the close operation in step S321 (step S321—NO), the control unit 54 determines whether or not the operation signal is the operation signal for performing the tilt-down operation or the operation signal for performing the open operation (step S324).

When the operation signal is the operation signal for performing the tilt-down operation or the operation signal for performing the open operation (step S324—YES), the control unit 54 detects the vehicle speed or the load of the brushless motor 30 of the motor unit 19, and determines whether or not it is a state in which the high output mode is necessary based on the detection result (step S325).

When the vehicle speed exceeds the vehicle speed reference value or when the load of the brushless motor 30 exceeds the load reference value, the control unit 54 determines that the high output mode is necessary (step S325—YES), and executes the tilt-down action or the open action by performing the wide-angle trapezoidal wave current-supply drive of the brushless motor 30 (step S323). Accordingly, when the operation signal indicates the tilt-down operation, the control unit 54 performs the tilt-down action by performing the wide-angle trapezoidal wave current-supply drive of the motor unit 19. In addition, when the operation signal indicates the open operation, the open action is performed by performing the wide-angle trapezoidal wave current-supply drive of the motor unit 19.

On the other hand, when the vehicle speed does not exceed the vehicle speed reference value or when the load of the brushless motor 30 does not exceed the load reference value, the control unit 54 determines that the high output mode is not necessary (step S325—NO), and the control unit 54 executes the tilt-down action or the open action by performing the third harmonic current-supply drive of the motor unit 19 (step S326). Accordingly, when the operation signal indicates the tilt-down operation, the control unit 54 performs the tilt-down action by performing the third harmonic current-supply drive of the motor unit 19. In addition, when the operation signal indicates the open operation, the control unit 54 performs the open action by performing the third harmonic current-supply drive of the motor unit 19.

On the other hand, when the operation signal is not the operation signal for performing the tilt-down operation or the operation signal for performing the open operation in step S324 (step S324—NO), the control unit 54 determines that any one of failure, emergency stop, and the like occurs in which an unexpected operation input is made, and the control unit 54 stops the drive (step S325).

In this way, even in the case of performing the tilt-up action or the close action, the control unit 54 can drive the motor unit 19 by the third harmonic current-supply drive when the high output mode is not necessary. In addition, even in the case of the tilt-down action or the open action, the control unit 54 can perform the wide-angle trapezoidal wave current-supply drive when the high output mode is necessary.

Figure 19:
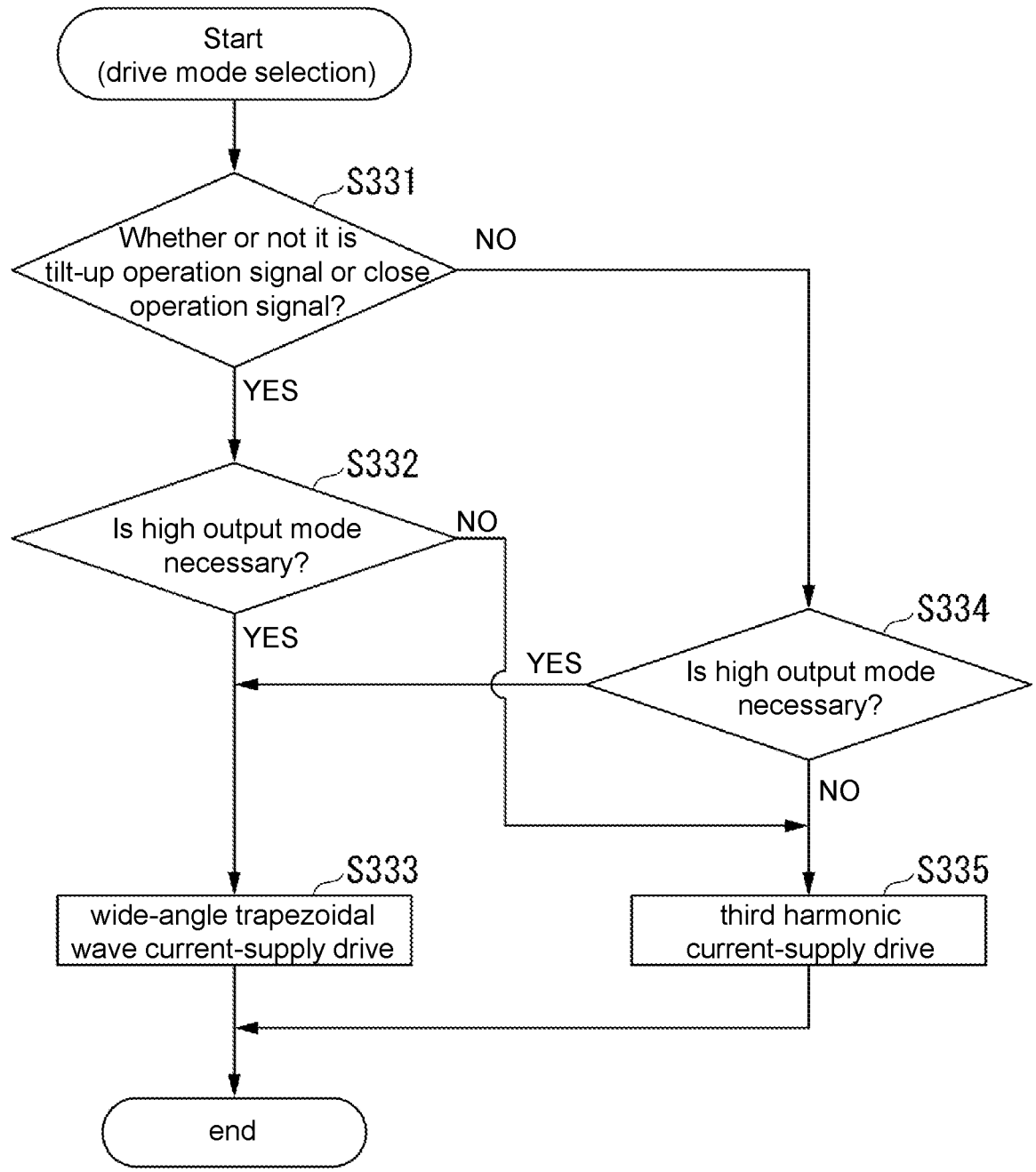
FIG. 19 is a diagram illustrating a variation example of the processing flow of the control unit 54 when the motor unit 19 is applied to the sunroof unit.

FIG. 19 is a diagram illustrating a variation example of the processing flow of the control unit 54 when the motor unit 19 is applied to the sunroof unit.

When the sunroof operator is operated by the driver, the control unit 54 acquires an operation signal from the sunroof operator, and determines whether or not the acquired operation signal is the operation signal for performing the tilt-up operation or the operation signal for performing the close operation (step S331).

When the operation signal is the operation signal for performing the tilt-up operation or the operation signal for performing the close operation (step S331—YES), the control unit 54 detects the vehicle speed or the load of the brushless motor 30 of the motor unit 19, and determines whether or not it is a state in which the high output mode is necessary based on the detection result (step S332). The determination determines, for example, whether or not the vehicle speed exceeds a vehicle speed reference value, or whether or not the load of the brushless motor 30 exceeds a load reference value. This determination may be made based on only one of whether or not the vehicle speed exceeds the vehicle speed reference value, and whether or not the load of the brushless motor 30 exceeds the load reference value. The vehicle speed reference value and the load reference value may be previously stored in, for example, an internal or external storage device of the control unit 54 for reference.

When the vehicle speed exceeds the vehicle speed reference value or when the load of the brushless motor 30 exceeds the load reference value, the control unit 54 determines that the high output mode is necessary (step S332—YES), and executes the tilt-up action or the close action by performing the wide-angle trapezoidal wave current-supply drive of the brushless motor 30 (step S333). Accordingly, when the operation signal indicates the tilt-up operation, the control unit 54 performs the tilt-up action by performing the wide-angle trapezoidal wave current-supply drive of the motor unit 19. In addition, when the operation signal indicates the close operation, the close action is performed by performing the wide-angle trapezoidal wave current-supply drive of the motor unit 19.

On the other hand, when the vehicle speed does not exceed the vehicle speed reference value or when the load of the brushless motor 30 does not exceed the load reference value, the control unit 54 determines that the high output mode is not necessary (step S332—NO), and executes the tilt-up action or the close action by performing the third harmonic current-supply drive of the brushless motor 30 (step S335). Accordingly, when the operation signal indicates the tilt-up operation, the control unit 54 performs the tilt-up action by performing the third harmonic current-supply drive of the motor unit 19. In addition, when the operation signal indicates the close operation, the close action is performed by performing the third harmonic current-supply drive of the motor unit 19. Accordingly, even in the case of the tilt-up action or the close action, the drive can be performed by the third harmonic current-supply drive in a situation where the high output mode is not necessary.

On the other hand, when the operation signal is not the operation signal for performing the tilt-up operation or the operation signal for performing the close operation in step S331 (step S331—NO), the control unit 54 detects the vehicle speed or the load of the brushless motor 30 of the motor unit 19, and determines whether or not it is a state in which the high output mode is necessary based on the detection result (step S334). When the vehicle speed exceeds the vehicle speed reference value or when the load of the brushless motor 30 exceeds the load reference value, the control unit 54 determines that the high output mode is necessary (step S334—YES), and executes the tilt-down action or the open action by performing the wide-angle trapezoidal wave current-supply drive of the brushless motor 30 (step S333). Accordingly, when the operation signal indicates the tilt-down operation, the control unit 54 performs the tilt-down action by performing the wide-angle trapezoidal wave current-supply drive of the motor unit 19. In addition, when the operation signal indicates the open operation, the control unit 54 performs the open action by performing the wide-angle trapezoidal wave current-supply drive of the motor unit 19.

On the other hand, when the vehicle speed does not exceed the vehicle speed reference value or when the load of the brushless motor 30 does not exceed the load reference value, the control unit 54 determines that the high output mode is not necessary (step S334—NO), and the control unit 54 executes the tilt-down action or the open action by performing the third harmonic current-supply drive of the motor unit 19 (step S326). Accordingly, when the operation signal indicates the tilt-down operation, the control unit 54 performs the tilt-down action by performing the third harmonic current-supply drive of the motor unit 19. In addition, when the operation signal indicates the open operation, the control unit 54 performs the open action by performing the third harmonic current-supply drive of the motor unit 19. According to the variation example, when it is determined as NO in step S331, the control unit 54 does not need to perform the determination step as to whether the operation is the tilt-down operation or the open operation shown in step S324 of FIG. 18.

Figure 20:
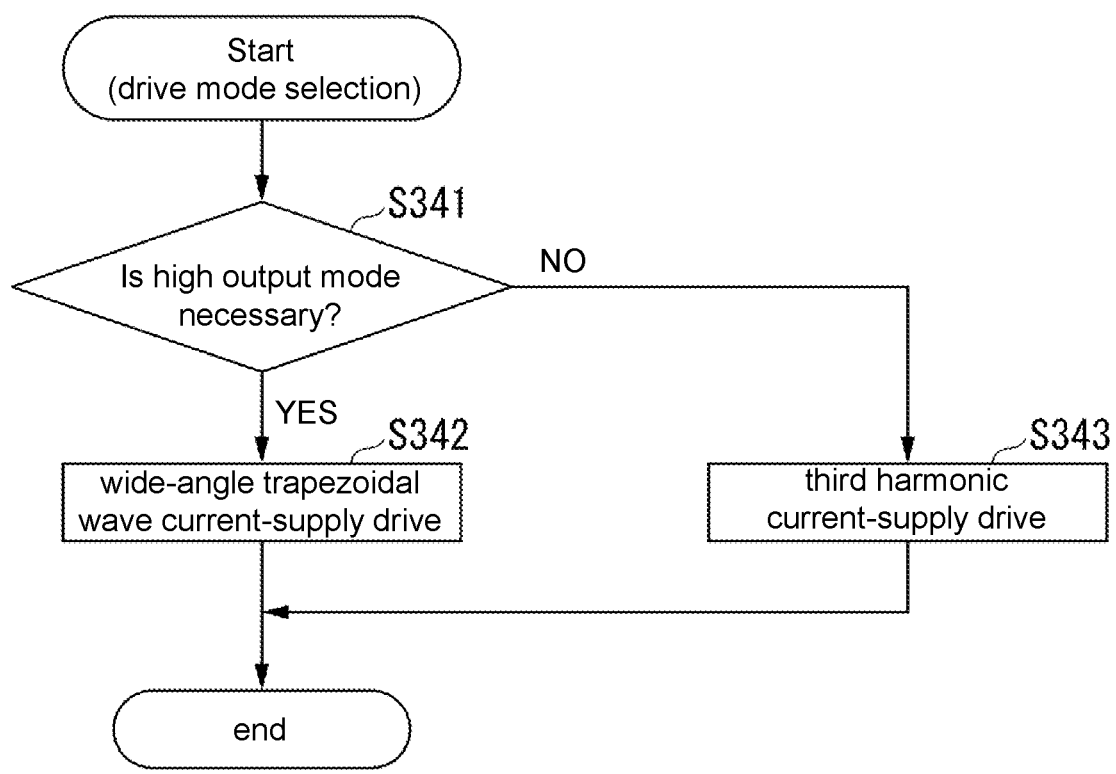
FIG. 20 is a diagram illustrating a variation example of the processing flow of the control unit 54 when the motor unit 19 is applied to the sunroof unit.

FIG. 20 is a diagram illustrating a variation example of the processing flow of the control unit 54 when the motor unit 19 is applied to the sunroof unit.
When the sunroof operator is operated by the driver, the control unit 54 acquires an operation signal from the sunroof operator, detects the vehicle speed or the load of the brushless motor 30 of the motor unit 19, and determines whether or not it is a state in which the high output mode is necessary based on the detection result (step S341). The determination determines, for example, whether or not the vehicle speed exceeds a vehicle speed reference value, or whether or not the load of the brushless motor 30 exceeds a load reference value. This determination may be made based on only one of whether or not the vehicle speed exceeds the vehicle speed reference value, and whether or not the load of the brushless motor 30 exceeds the load reference value. The vehicle speed reference value and the load reference value may be previously stored in, for example, an internal or external storage device of the control unit 54 for reference.

When the vehicle speed exceeds the vehicle speed reference value or when the load of the brushless motor 30 exceeds the load reference value, the control unit 54 determines that the high output mode is necessary (step S341—YES), and executes an action based on the operation signal by performing the wide-angle trapezoidal wave current-supply drive of the brushless motor 30 (step S342). Accordingly, when the operation signal indicates the tilt-up operation, the control unit 54 performs the tilt-up action by performing the wide-angle trapezoidal wave current-supply drive of the motor unit 19, and when the operation signal indicates the close operation, the close action is performed by performing the wide-angle trapezoidal wave current-supply drive of the motor unit 19. In addition, when the operation signal indicates the tilt-down operation, the control unit 54 performs the tilt-down action by performing the wide-angle trapezoidal wave current-supply drive of the motor unit 19, and when the operation signal indicates the open operation, the control unit 54 performs the open action by performing the wide-angle trapezoidal wave current-supply drive of the motor unit 19.

On the other hand, when the vehicle speed does not exceed the vehicle speed reference value or when the load of the brushless motor 30 does not exceed the load reference value, the control unit 54 determines that the high output mode is not necessary (step S341—NO), and executes the action based on the operation signal by performing the third harmonic current-supply drive of the brushless motor 30 (step S343). Accordingly, when the operation signal indicates the tilt-up operation, the control unit 54 performs the tilt-up action by performing the third harmonic current-supply drive of the motor unit 19, and when the operation signal indicates the close operation, the close action is performed by performing the third harmonic current-supply drive of the motor unit 19. In addition, when the operation signal indicates the tilt-down operation, the control unit 54 performs the tilt-down action by performing the third harmonic current-supply drive of the motor unit 19, and when the operation signal indicates the open operation, the control unit 54 performs the open action by performing the third harmonic current-supply drive of the motor unit 19.

According to the variation example, the control unit 54 can decide whether to perform the wide-angle trapezoidal wave current-supply drive or perform the third harmonic current-supply drive based on the determination result of whether or not the high output mode is necessary, but not on the type of the operation content of the sunroof operator operated by the driver. Moreover, the sunroof can be controlled according to the operation content.

Figure 21A:
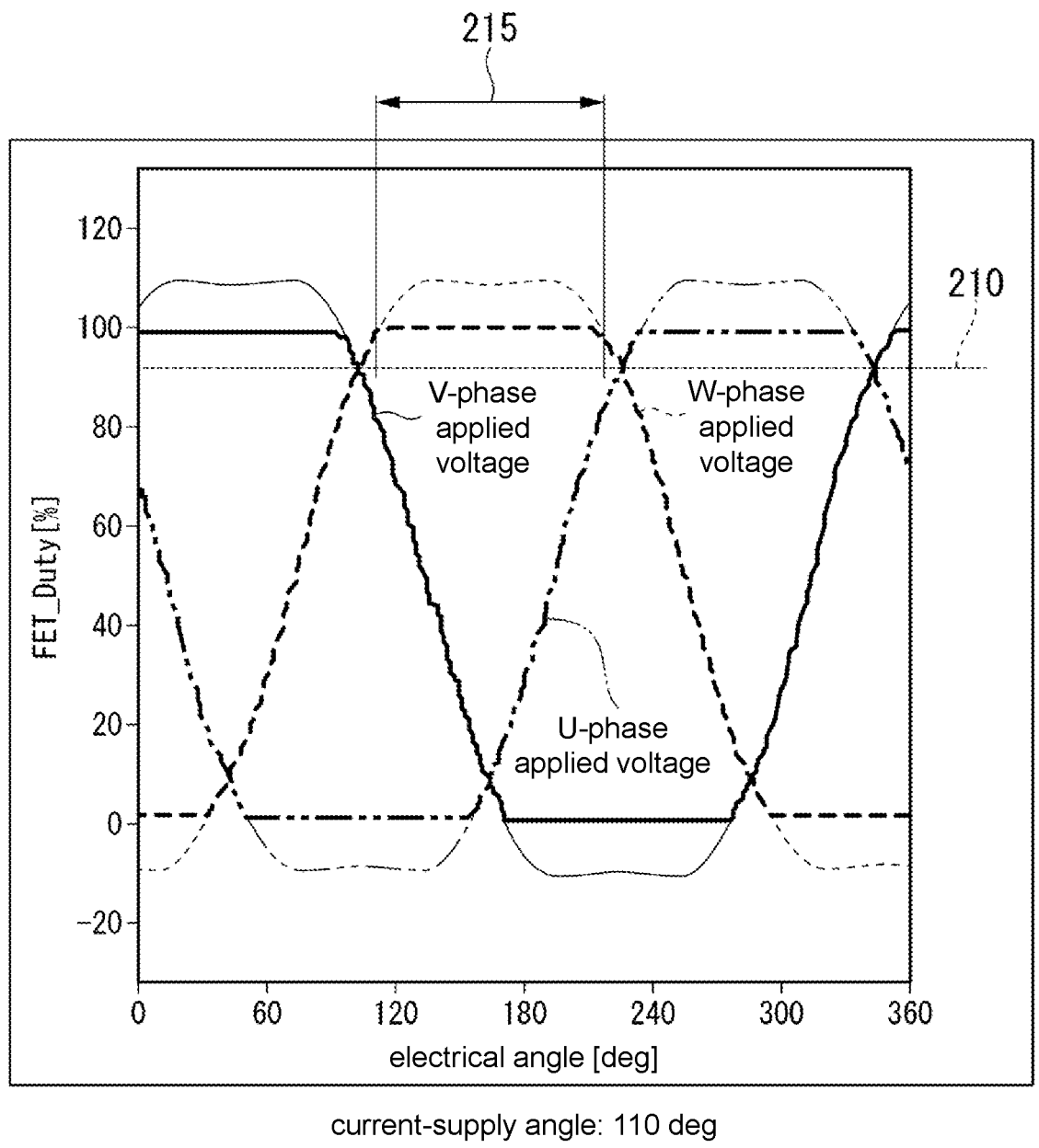
FIG. 21A is a timing chart showing the current-supply timing of each of U phase, V phase, and W phase by the second drive control unit 642 in the embodiment.
Figure 21B:
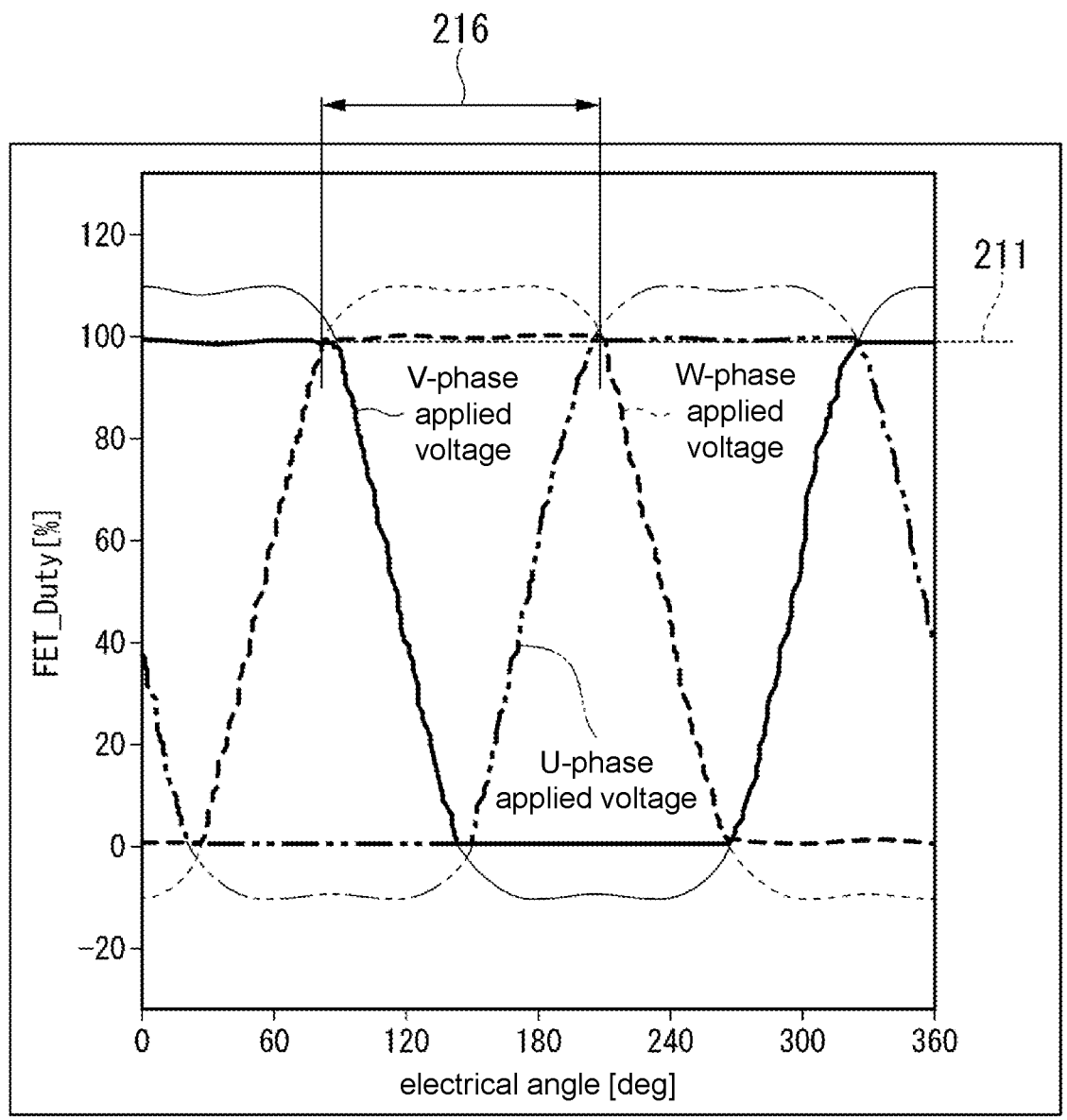
FIG. 21B is a timing chart showing the current-supply timing of each of U phase, V phase, and W phase by the second drive control unit 642 in the embodiment.
Figure 21C:
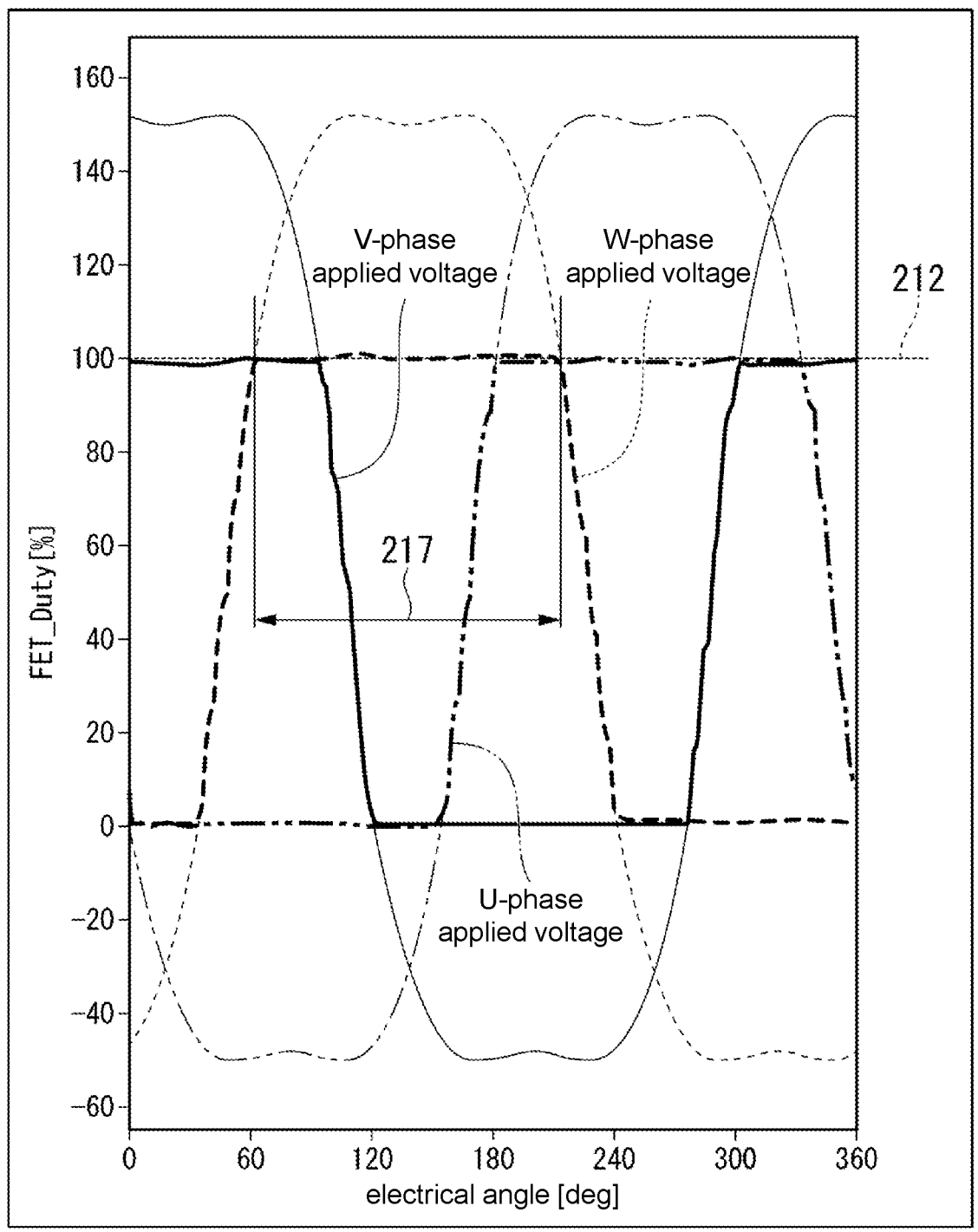
FIG. 21C is a timing chart showing the current-supply timing of each of U phase, V phase, and W phase by the second drive control unit 642 in the embodiment.

FIGS. 21A to 21C are diagrams showing the results of experiments on the action of the motor unit 19.
The angles from 0° to 360° shown on the horizontal axis of FIGS. 21A to 21C are electrical angles representing the current-supply period within one cycle of the second current-supply signal. In addition, the FET_DUTY [%] shown on the vertical axis represents the applied voltage applied to each phase.

FIG. 21A is a timing chart showing the current-supply timing of each of U phase, V phase, and W phase by the second drive control unit 642 in the embodiment.
FIG. 21A shows the waveform of the second current-supply signal, and shows the waveform when the wide-angle trapezoidal wave current-supply drive is performed so that a current-supply section (hereinafter, referred to as a 100% current-supply angle) (reference sign 215) in which the FET_Duty [%] is 100% or more becomes 110°, wherein the FET_Duty [%] is the duty of the applied voltage of each of the three phases in which the third harmonic is superimposed on the sine wave. Here, for any two of the three phases namely U-phase, V-phase, and W-phase (at least one of V-phase and W-phase, W-phase and U-phase, and U-phase and V-phase), a duty value when the duty of the applied voltages is the same is about 90% (reference sign 210).
Here, as shown in FIG. 6, in the first current-supply signal, for any two of the three phases namely U-phase, V-phase, and W-phase (at least one of V-phase and W-phase, W-phase and U-phase, and U-phase and V-phase), a duty value when the duty of the applied voltages is the same is about 80% (reference sign 600). Therefore, the duty value when the duty of the applied voltages is the same is larger in the second current-supply signal (the second control mode) than in the first current-supply signal (the first control mode).

FIG. 21B is a timing chart showing the current-supply timing of each of U phase, V phase, and W phase by the second drive control unit 642 in the embodiment.

Here, FIG. 21B shows the waveform of the second current-supply signal, and shows the waveform when the wide-angle trapezoidal wave current-supply drive is performed so that the 100% current-supply angle (reference sign 216) becomes 130°. In addition, here, for any two of the three phases namely U-phase, V-phase, and W-phase (at least one of V-phase and W-phase, W-phase and U-phase, and U-phase and V-phase), a duty value when the duty of the applied voltages is the same is about 100% (reference sign 211). Therefore, in the first current-supply signal (the first control mode) shown in FIG. 6, for any two of the three phases, the duty value when the duty of the applied voltages is the same is about 80%. In contrast, in the second current-supply signal (the second control mode), for any two of the three phases, the duty value when the duty of the applied voltages is the same is about 100%. Therefore, the duty value when the duty of the applied voltages is the same is larger in the second current-supply signal (the second control mode) than in the first current-supply signal (the first control mode).

FIG. 21C is a timing chart showing the current-supply timing of each of U phase, V phase, and W phase by the second drive control unit 642 in the embodiment.

Here, FIG. 21C shows the waveform of the second current-supply signal, and shows the waveform when the wide-angle trapezoidal wave current-supply drive is performed so that the 100% current-supply angle (reference sign 217) becomes 155°. The second current-supply signal has an overlap current-supply section. In addition, here, for any two of the three phases namely U-phase, V-phase, and W-phase (at least one of V-phase and W-phase, W-phase and U-phase, and U-phase and V-phase), a duty value when the duty of the applied voltages is the same is about 120% (reference sign 212), and the apparent FET_Duty [%] of the two phases is both 100% in the overlap current-supply section.

In FIG. 21C, in the first current-supply signal (the first control mode) shown in FIG. 6, for any two of the three phases, the duty value when the duty of the applied voltages is the same is about 80%. In contrast, in the second current-supply signal (the second control mode), for any two of the three phases, the duty value when the duty of the applied voltages is the same is about 120%. Therefore, even when the current-supply angle is expanded to 155°, the duty value when the duty of the applied voltages is the same is larger in the second current-supply signal (the second control mode) than in the first current-supply signal (the first control mode).

In addition, the control unit 54 can perform the drive in a way that current consumption and motor output have a target balance when the 100% current-supply angle is controlled in the range of 110° to 155° in the second current-supply signal. For example, when the current consumption is controlled prior to the motor output, the 100% current-supply angle may be set to a value closer to 110° in the range of 110° to 155°, and the current consumption can be further reduced when the 100% current-supply angle is set to 110°. On the other hand, when improvement of the motor output is controlled prior to the current consumption, the 100% current-supply angle may be set to a value closer to 155° in the range of 110° to 155°, and the motor output can be further improved when the 100% current-supply angle is set to 155°.

Figure 22:
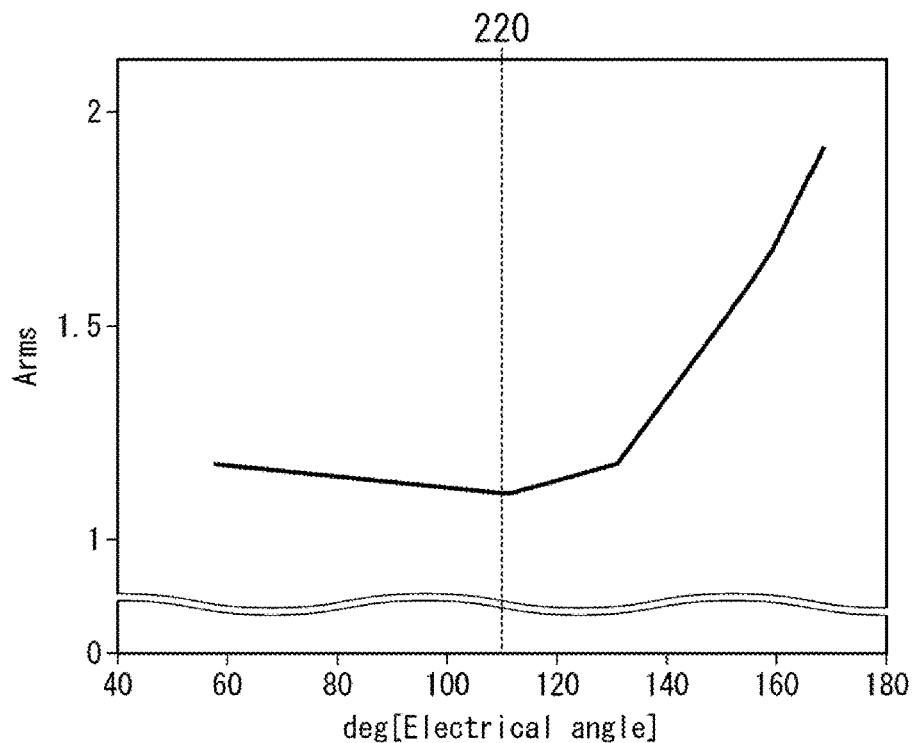
FIG. 22 is a diagram showing a relationship between current consumption and an electrical angle when a current-supply angle is set to an electrical angle of 110° in the second current-supply signal.

FIG. 22 is a diagram showing a relationship between the current consumption and the 100% current-supply angle in the second current-supply signal. In the diagram, the vertical axis represents the current consumption, and the horizontal axis represents the 100% current-supply angle. Here, as shown by reference sign 220, it can be confirmed that the current consumption is the smallest when the 100% current-supply angle is set to 110°.

Figure 23:
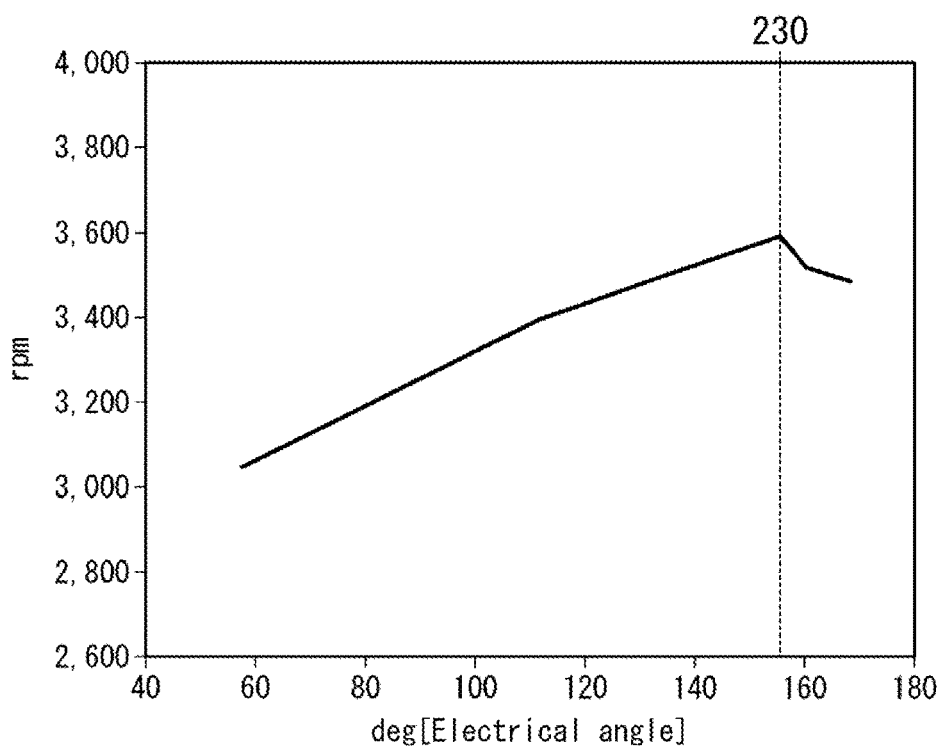
FIG. 23 is a diagram showing a relationship between the rotation speed of the motor and the electrical angle when the current-supply angle is set to an electrical angle of 155° in the second current-supply signal.

FIG. 23 is a diagram showing a relationship between the rotation speed of the motor and the 100% current-supply angle when the 100% current-supply angle is set to 155° in the second current-supply signal. In the diagram, the vertical axis represents the rotation speed of the motor, and the horizontal axis represents the 100% current-supply angle. Here, as shown by reference sign 230, it can be confirmed that when the 100% current-supply angle is set to 155°, the rotation speed of the motor becomes the greatest, that is, the motor output becomes the greatest.

When the 100% current-supply angle is increased from 110°, the rotation speed of the motor increases as the 100% current-supply angle approaches 155°, the rotation speed becomes the greatest when the 100% current-supply angle is 155°, and the rotation speed decreases when the 100% current-supply angle exceeds 155°. This is because by increasing the 100% current-supply angle, the number of waves advancing with respect to the first current-supply signal increases, but when the 100% current-supply angle exceeds 155°, the influence of the retarding wave is greater than the influence of the advancing wave. Therefore, the retarding wave causes a drag torque (a force trying to turn the rotor in the opposite direction), and thus the rotation speed is lower than the peak value.

In addition, in the above-described embodiment, the motor control device 33 decides the rotational position of the rotor 22 based on the pulse signals supplied from the rotation angle detection unit 39, but it is not limited hereto. For example, the motor control device 33 may decide the rotational position of the rotor 22 based on an induced voltage generated in each of the armature coils 21*u*, 21*v*, and 21*w* according to the rotation of the rotor 22. Accordingly, the rotation angle detection unit 39 that detects the rotational position of the rotor 22 becomes unnecessary, and thus the number of components and the manufacturing cost of the brushless motor 30 can be reduced.

In addition, in the above-described embodiment, the wiper device 12 may include an output shaft sensor that detects at least one of the rotation speed and the absolute position of the output shaft 26. The absolute position refers to a rotation angle of the output shaft 26 with respect to the reference position. The reference position may be set as any position within the range of 360 degrees. The motor control device 33 may decide the rotational position of the rotor 22 based on a detection signal from the output shaft sensor.

In addition, in the above-described embodiment, the wiper device 12 may wipe not only the front glass 11 of the vehicle 10 but also a rear glass. In addition, the wiper device 12 may have a structure in which the wiper arms 14 and 16 swing with the output shaft 26 as a fulcrum.

In addition, in the above-described embodiment, the wiper device 12 may have a configuration in which the two wiper arms 14 and 16 are respectively driven by different brushless motors. In addition, the brushless motor 30 of the embodiment may be a motor having an interior permanent magnet (IPM) structure or a motor having a surface permanent magnet (SPM) structure.

In addition, in the above-described embodiment, the modes selected by the wiper switch 37 are not limited to the two types of low-speed working mode and high-speed working mode, and may be three or more types of mode. For example, the modes selected by the wiper switch 37 may be three types of mode: a low-speed working mode, a medium-speed working mode, and a high-speed working mode. Here, the rotation speed of the rotor 22 in the medium-speed working mode is higher than the rotation speed of the rotor 22 in the low-speed working mode, and is lower than the rotation speed of the rotor 22 in the high-speed working mode. For example, when the medium-speed working mode is selected by the wiper switch 37, the motor control device 33 may perform, on the brushless motor 30, the third harmonic current-supply drive or the wide-angle trapezoidal wave current-supply drive.

In addition, not only in the high-speed working mode, the medium-speed working mode, and the low-speed working mode, but also when it is judged that the load applied to the brushless motor 30 is high, the wide-angle trapezoidal wave current-supply drive or the wide-angle trapezoidal wave+"advance angle >0°" current-supply drive may be performed. In other words, regardless of the modes selected by the wiper switch 37, when a high load signal to the mode determination unit 63 is acquired, the wide-angle trapezoidal wave current-supply drive or the wide-angle trapezoidal wave+"advance angle >0°" current-supply drive can be performed.

In addition, the case where the working mode is selected according to the switching of the wiper switch 37 is described, but the working mode may be switched based on the detection result from a raindrop sensor instead of the wiper switch 37. For example, the raindrop sensor has a function of detecting the rainfall situation around the vehicle and is attached to the vehicle. Based on the detection result from the raindrop sensor, the mode may be switched to the low-speed working mode when the amount of rainfall is less than a reference value, and switched to the high-speed working mode when the amount of rainfall exceeds the reference value. In addition, by setting three reference values for the amount of rainfall, the mode may be switched to one of the three types of mode: the low-speed working mode, the medium-speed working mode, and the high-speed working mode.

The control unit 54 in the above-described embodiment may be realized by a computer. In that case, the realization may be made by recording a program for realizing the function on a computer-readable recording medium, and making a computer system read and execute the program recorded on the recording medium. Note that, the "computer system" here includes an OS and hardware such as peripheral devices and the like. In addition, the "computer-readable recording medium" refers to a portable medium such as a flexible disk, a magneto-optical disk, a ROM, a CD-ROM, or the like; or a storage device such as a hard disk or the like built in the computer system. Furthermore, the "computer-readable recording medium" may also include: a recording medium that dynamically holds the program for a short period of time, in the same manner as a communication line when the program is transmitted via a network such as the Internet or the like, or a communication circuit such as a telephone circuit or the like; and a recording medium that holds the program for a certain period of time, in the same manner as a volatile memory inside the computer system that serves as a server or a client in that case. In addition, the above-mentioned program may be a program for realizing a part of the above-described function, a program that can further realize the above-described function in combination with the program already recorded in the computer system, or a program by which the function is realized using a programmable logic device such as a field programmable gate array (FPGA) or the like.

In addition, in the above-described embodiment, when the vehicle speed V measured by the vehicle speed sensor 40 exceeds the predetermined value Vth, or when the predetermined value or the rotation speed of the rotor 22 that is detected based on the pulse signals supplied from the rotation angle detection unit 39 exceeds the predetermined value that is preset, the load determination unit 62 determines that the load of the brushless motor 30 is a high load, but it is not limited hereto. For example, when the resistance value due to an external force increases with respect to the action of the brushless motor 30 during the action in the low output mode, the rotation speed (number of rotations) of the rotor 22 decreases (deviates) from a preset target rotation speed (target number of rotations). At this time, in order to match the rotation speed (number of rotations) of the rotor 22 with the preset target rotation speed (target number of rotations), the control unit 54 increases the duty value within the range of the low output mode. Then, when the control unit 54 recognizes that the duty value exceeds a predetermined threshold value, the mode may be shifted from the low output mode to the high output mode.

As described above, the embodiment of the present invention is described in detail with reference to the drawings, but the specific configuration is not limited to the embodiment, and designs and the like within a range not departing from the gist of the present invention are also included.

What is claimed is:

1. A motor control device, which controls a brushless motor comprising a rotor and a three-phase armature coil of U-phase, V-phase, and W-phase, comprising:
   a position detection unit which detects a rotational position of the rotor;
   a control unit capable of selecting a first control mode and a second control mode, and which
   outputs, in the first control mode, a first drive signal to an inverter at a current-supply timing based on the rotational position of the rotor, and
   outputs, in the second control mode, a second drive signal to the inverter at the current-supply timing based on the rotational position of the rotor; and
   the inverter which outputs, in the first control mode, a first current-supply signal as an applied voltage applied to the three-phase armature coil, and
   outputs, in the second control mode, a second current-supply signal as the applied voltage applied to the three-phase armature coil; wherein
   for any two of the three phases, when a duty of the applied voltages becomes the same, a duty value in the second control mode is larger than a duty value in the first control mode, wherein
   the first current-supply signal has
   a waveform which is a third harmonic with a frequency that is triple of a fundamental frequency of a sine wave, and
   the second current-supply signal has
   a waveform which comprises, in the waveform which is the third harmonic with the frequency that is triple of the fundamental frequency of the sine wave,
   a first overlap section between a section where only the duty of the applied voltage of the U-phase among the three phases is 100% and a section where only the duty of the applied voltage of the V-phase among the three phases is 100%, in which both the duty of the applied voltage of the U-phase and the duty of the applied voltage of the V-phase are 100%;

a second overlap section between the section where only the duty of the applied voltage of the V-phase among the three phases is 100% and a section where only the duty of the applied voltage of the W-phase among the three phases is 100%, in which both the duty of the applied voltage of the V-phase and the duty of the applied voltage of the W-phase are 100%; and a third overlap section between the section where only the duty of the applied voltage of the W-phase among the three phases is 100% and the section where only the duty of the applied voltage of the U-phase among the three phases is 100%, in which both the duty of the applied voltage of the W-phase and the duty of the applied voltage of the U-phase are 100%.

2. The motor control device according to claim 1, wherein in the second control mode, the control unit outputs the second drive signal to the inverter at the current-supply timing that is advanced by an electrical angle larger than an advance angle in the first control mode with reference to the rotational position of the rotor.

3. The motor control device according to claim 2, wherein the second current-supply signal has a waveform in which an amplitude of the first current-supply signal is changed to a value larger than 50% of the duty of the applied voltage applied to the armature coil, the duty of the applied voltage is set to 100% in a section where the duty of the applied voltage is 100% or more, and the duty of the applied voltage is set to 0% in a section where the duty of the applied voltage is 0% or less.

4. The motor control device according to claim 2, wherein the control unit performs current supply so that a section where the duty of the applied voltage of at least one of the three phases is 100% or more is in a range of 110° to 155°.

5. The motor control device according to claim 1, wherein the second current-supply signal has a waveform in which an amplitude of the first current-supply signal is changed to a value larger than 50% of the duty of the applied voltage applied to the armature coil, the duty of the applied voltage is set to 100% in a section where the duty of the applied voltage is 100% or more, and the duty of the applied voltage is set to 0% in a section where the duty of the applied voltage is 0% or less.

6. The motor control device according to claim 5, wherein the control unit performs current supply so that a section where the duty of the applied voltage of at least one of the three phases is 100% or more is in a range of 110° to 155°.

7. The motor control device according to claim 1, wherein the control unit performs current supply so that a section where the duty of the applied voltage of at least one of the three phases is 100% or more is in a range of 110° to 155°.

8. A motor unit, comprising:
a brushless motor which is a brushless wiper motor that makes a wiper arm swing, and
the motor control device according to claim 1.

9. A motor unit, comprising:
a brushless sunroof motor for opening and closing a roof panel, and
the motor control device according to claim 1.

10. A motor control method of a motor control device which controls a brushless motor comprising a rotor and a three-phase armature coil of U-phase, V-phase, and W-phase, wherein the motor control device comprises:
a position detection unit which detects a rotational position of the rotor;
a control unit capable of selecting a first control mode and a second control mode, and which
outputs, in the first control mode, a first drive signal to an inverter at a current-supply timing based on the rotational position of the rotor, and
outputs, in the second control mode, a second drive signal to the inverter at the current-supply timing based on the rotational position of the rotor; and
the inverter which outputs, in the first control mode, a first current-supply signal as an applied voltage applied to the three-phase armature coil, and
outputs, in the second control mode, a second current-supply signal as the applied voltage applied to the three-phase armature coil; and
the control unit performs control in a way that for any two of the three phases, when a duty of the applied voltages becomes the same, a duty value in the second control mode is larger than a duty value in the first control mode, wherein the first current-supply signal has
a waveform which is a third harmonic with a frequency that is triple of a fundamental frequency of a sine wave, and the second current-supply signal has
a waveform which comprises, in the waveform which is the third harmonic with the frequency that is triple of the fundamental frequency of the sine wave, a first overlap section between a section where only the duty of the applied voltage of the U-phase among the three phases is 100% and a section where only the duty of the applied voltage of the V-phase among the three phases is 100%, in which both the duty of the applied voltage of the U-phase and the duty of the applied voltage of the V-phase are 100%;

a second overlap section between the section where only the duty of the applied voltage of the V-phase among the three phases is 100% and a section where only the duty of the applied voltage of the W-phase among the three phases is 100%, in which both the duty of the applied voltage of the V-phase and the duty of the applied voltage of the W-phase are 100%; and a third overlap section between the section where only the duty of the applied voltage of the W-phase among the three phases is 100% and the section where only the duty of the applied voltage of the U-phase among the three phases is 100%, in which both the duty of the applied voltage of the W-phase and the duty of the applied voltage of the U-phase are 100%.

\* \* \* \* \*